(12) United States Patent
Chandran et al.

(10) Patent No.: US 12,203,040 B2
(45) Date of Patent: Jan. 21, 2025

(54) TWO-STAGE SYNGAS PRODUCTION WITH SEPARATE CHAR AND PRODUCT GAS INPUTS INTO THE SECOND STAGE

(71) Applicant: ThermoChem Recovery International, Inc., Baltimore, MD (US)

(72) Inventors: Ravi Chandran, Ellicott City, MA (US); Dave G. Newport, Cumberland, ME (US); Daniel A. Burciaga, Manchester, MD (US); Daniel Michael Leo, Baltimore, MD (US)

(73) Assignee: ThermoChem Recovery International, Inc., Baltimore, MD (US)

( * ) Notice: Subject to any disclaimer, the term of this patent is extended or adjusted under 35 U.S.C. 154(b) by 0 days.

(21) Appl. No.: 18/232,439

(22) Filed: Aug. 10, 2023

(65) Prior Publication Data

US 2024/0059991 A1    Feb. 22, 2024

Related U.S. Application Data

(63) Continuation of application No. 17/957,670, filed on Sep. 30, 2022, now Pat. No. 11,760,949, which is a
(Continued)

(51) Int. Cl.
*C10J 3/72* (2006.01)
*C10K 1/00* (2006.01)
*C10K 1/02* (2006.01)

(52) U.S. Cl.
CPC .............. *C10J 3/721* (2013.01); *C10K 1/005* (2013.01); *C10K 1/026* (2013.01);
(Continued)

(58) Field of Classification Search
CPC ................ C10J 3/721; C10J 2300/0946; C10J 2300/0959; C10J 2300/1261;
(Continued)

(56) References Cited

U.S. PATENT DOCUMENTS 2,603,608 A    7/1952  Lewis et al.
2,619,124 A   11/1952  Bertin et al.
(Continued)

FOREIGN PATENT DOCUMENTS

CA    0975643   10/1975
CA    2705066    5/2009
(Continued)

OTHER PUBLICATIONS

Machine Translation of JPH1081886A (Feb. 29, 2024) (Year: 2024).*
(Continued)

*Primary Examiner* — Matthew J Merkling
(74) *Attorney, Agent, or Firm* — Fish & Richardson P.C.

(57) ABSTRACT

A two-stage syngas production method to produce a final product gas from a carbonaceous material includes producing a first product gas in a first reactor, separating char from the first product gas to produce separated char and char-depleted product gas, and separately reacting the separated char and the char-depleted product gas with an oxygen-containing gas in a second reactor to produce a final product gas. The separated char is introduced into the second reactor above the char-depleted product gas. The solids separation device may include serially connected cyclones, and the separated char may be entrained in a motive fluid in an eductor to produce a char and motive fluid mixture prior to being transferred to the second reactor. A biorefinery method produces a purified product from the final product gas.

24 Claims, 10 Drawing Sheets

Related U.S. Application Data continuation of application No. 17/012,901, filed on Sep. 4, 2020, now Pat. No. 11,466,223.

(52) U.S. Cl.
CPC ............... *C10J 2300/0946* (2013.01); *C10J 2300/0959* (2013.01); *C10J 2300/1261* (2013.01); *C10J 2300/1618* (2013.01); *C10J 2300/1637* (2013.01); *C10J 2300/1815* (2013.01); *C10J 2300/1846* (2013.01); *C10J 2300/1853* (2013.01)

(58) Field of Classification Search
CPC ........ C10J 2300/1618; C10J 2300/1637; C10J 2300/1815; C10J 2300/1846; C10J 2300/1853; C10K 1/005; C10K 1/026
See application file for complete search history.

(56) References Cited

U.S. PATENT DOCUMENTS

| | | |
|---|---|---|
| 2,642,895 A | 6/1953 | Bertin et al. |
| 2,670,011 A | 2/1954 | Bertin et al. |
| 2,680,065 A | 6/1954 | Atwell |
| 2,727,535 A | 12/1955 | Linderoth |
| 2,795,931 A | 6/1957 | Foll |
| 2,812,635 A | 11/1957 | Foll et al. |
| 2,825,203 A | 3/1958 | Bertin et al. |
| 2,903,416 A | 9/1959 | Metrailer |
| 2,912,821 A | 11/1959 | Horak |
| 2,929,774 A | 3/1960 | Smith |
| 3,039,955 A | 6/1962 | Honnold, Jr. |
| 3,674,409 A | 7/1972 | Desty et al. |
| 3,840,354 A | 10/1974 | Donath |
| 3,844,733 A | 10/1974 | Donath |
| 3,853,498 A | 12/1974 | Bailie |
| 3,894,562 A | 7/1975 | Moseley, Jr. et al. |
| 3,910,494 A | 10/1975 | Melton, Jr. |
| 3,927,996 A | 12/1975 | Knudsen et al. |
| 3,954,380 A | 5/1976 | Valaev et al. |
| 3,957,458 A | 5/1976 | Squires |
| 3,976,592 A | 8/1976 | Lacey et al. |
| 4,052,172 A | 10/1977 | Shirakawa et al. |
| 4,061,562 A | 12/1977 | McKinney et al. |
| 4,069,024 A | 1/1978 | Fernandes |
| 4,077,778 A | 3/1978 | Nahas et al. |
| 4,078,973 A | 3/1978 | Choi et al. |
| 4,080,149 A | 3/1978 | Wolfe |
| 4,097,361 A | 6/1978 | Ashworth |
| 4,105,545 A | 8/1978 | Muller et al. |
| 4,219,402 A | 8/1980 | DeGeorge |
| 4,279,710 A | 7/1981 | Coughlin |
| 4,300,916 A | 11/1981 | Frewer et al. |
| 4,347,064 A | 8/1982 | Reh et al. |
| 4,355,586 A | 10/1982 | Brown |
| 4,356,151 A | 10/1982 | Woebcke et al. |
| 4,357,603 A * | 11/1982 | Roach ............... G01N 29/032 340/627 |
| 4,400,181 A | 8/1983 | Snell et al. |
| 4,484,885 A | 11/1984 | Machii et al. |
| 4,519,810 A | 5/1985 | Haas |
| 4,522,685 A | 6/1985 | Feldmann |
| 4,532,024 A | 7/1985 | Haschke et al. |
| 4,569,310 A | 2/1986 | Davis |
| 4,639,208 A | 1/1987 | Inui et al. |
| 4,688,521 A | 8/1987 | Korenberg |
| 4,697,358 A | 10/1987 | Kitchen |
| 4,857,084 A | 8/1989 | Robbins et al. |
| 4,909,914 A | 3/1990 | Chiba et al. |
| 4,959,009 A | 9/1990 | Hemsath |
| 5,059,404 A | 10/1991 | Mansour et al. |
| 5,064,444 A | 11/1991 | Kubiak et al. |
| 5,125,965 A | 6/1992 | Sebenik |
| 5,133,297 A | 7/1992 | Mansour |
| 5,156,099 A | 10/1992 | Ohshita et al. |
| 5,168,835 A | 12/1992 | Last |
| 5,197,399 A | 3/1993 | Mansour |
| 5,205,728 A | 4/1993 | Mansour |
| 5,211,704 A | 5/1993 | Mansour |
| 5,255,634 A | 10/1993 | Mansour |
| 5,306,481 A | 4/1994 | Mansour et al. |
| 5,353,721 A | 10/1994 | Mansour et al. |
| 5,366,371 A | 11/1994 | Mansour et al. |
| 5,439,491 A | 8/1995 | Kubiak et al. |
| 5,473,885 A | 12/1995 | Hunter, Jr. et al. |
| 5,536,488 A | 7/1996 | Mansour et al. |
| 5,624,470 A | 4/1997 | Tanca |
| 5,635,147 A | 6/1997 | Herbert et al. |
| 5,637,192 A | 6/1997 | Mansour et al. |
| 5,638,609 A | 6/1997 | Chandran et al. |
| 5,667,560 A | 9/1997 | Dunne |
| 5,696,203 A | 12/1997 | Hummel et al. |
| 5,700,310 A | 12/1997 | Bowman et al. |
| 5,752,994 A | 5/1998 | Monacelli et al. |
| 5,800,153 A | 9/1998 | DeRoche |
| 5,842,289 A | 12/1998 | Chandran et al. |
| 5,853,548 A | 12/1998 | Piskorz et al. |
| 5,861,046 A | 1/1999 | Andersson |
| 5,937,635 A | 8/1999 | Winfree et al. |
| 6,114,399 A | 9/2000 | Roberts et al. |
| 6,133,499 A | 10/2000 | Horizoe et al. |
| 6,149,765 A | 11/2000 | Mansour et al. |
| 6,216,446 B1 | 4/2001 | Stram |
| 6,248,297 B1 | 6/2001 | Stine et al. |
| 6,248,796 B1 | 6/2001 | Jackson et al. |
| 6,446,428 B1 | 9/2002 | Kaemming et al. |
| 6,494,034 B2 | 12/2002 | Kaemming et al. |
| 6,495,610 B1 | 12/2002 | Brown |
| 6,548,197 B1 | 4/2003 | Chandran et al. |
| 6,584,765 B1 | 7/2003 | Tew et al. |
| 6,662,550 B2 | 12/2003 | Eidelman et al. |
| 6,667,022 B2 | 12/2003 | Cole |
| 6,680,137 B2 | 1/2004 | Paisley |
| 6,753,353 B2 | 6/2004 | Jackson et al. |
| 6,758,032 B2 | 7/2004 | Hunter et al. |
| 6,793,174 B2 | 9/2004 | Ouellette et al. |
| 6,824,383 B2 | 11/2004 | Cain |
| 6,863,878 B2 | 3/2005 | Klepper |
| 6,883,543 B2 | 4/2005 | Tew et al. |
| 6,923,004 B2 | 8/2005 | Chandran et al. |
| 6,931,833 B2 | 8/2005 | Lupkes |
| 6,938,588 B2 | 9/2005 | Jacobsen et al. |
| 6,997,118 B2 | 2/2006 | Chandran et al. |
| 7,047,724 B2 | 5/2006 | Nordeen et al. |
| 7,214,720 B2 | 5/2007 | Bayle et al. |
| 7,220,390 B2 | 5/2007 | Tonkovich et al. |
| 7,309,378 B2 | 12/2007 | Bancon et al. |
| 7,434,401 B2 | 10/2008 | Hayashi |
| 7,526,912 B2 | 5/2009 | Tangirala et al. |
| 7,531,014 B2 | 5/2009 | Chandran |
| 7,569,086 B2 | 8/2009 | Chandran |
| 7,572,362 B2 | 8/2009 | Freel et al. |
| 7,601,303 B1 | 10/2009 | Karer et al. |
| 7,637,096 B2 | 12/2009 | Razzell et al. |
| 7,735,311 B2 | 6/2010 | Eidelman et al. |
| 7,739,867 B2 | 6/2010 | Kenyon et al. |
| 7,758,334 B2 | 7/2010 | Shimo et al. |
| 7,775,460 B2 | 8/2010 | Berg et al. |
| 7,784,265 B2 | 8/2010 | Rasheed et al. |
| 7,828,546 B2 | 11/2010 | Wiedenhoefer et al. |
| 7,836,682 B2 | 11/2010 | Rasheed et al. |
| 7,841,167 B2 | 11/2010 | Rasheed et al. |
| 7,842,110 B2 | 11/2010 | Mansour et al. |
| 7,857,995 B2 | 12/2010 | Johnson et al. |
| 7,879,919 B2 | 2/2011 | Ernst et al. |
| 7,882,926 B2 | 2/2011 | Fullerton |
| 7,886,866 B2 | 2/2011 | Fullerton |
| 7,905,990 B2 | 3/2011 | Freel |
| 7,914,280 B2 | 3/2011 | Schlote et al. |
| 7,950,219 B2 | 5/2011 | Tangirala et al. |
| 7,964,004 B2 | 6/2011 | Koch et al. |
| 7,980,056 B2 | 7/2011 | Rasheed et al. |
| 8,007,688 B2 | 8/2011 | Dahlin et al. |

(56) References Cited

U.S. PATENT DOCUMENTS

| | | |
|---|---|---|
| 8,082,724 B2 | 12/2011 | Hirata et al. |
| 8,083,494 B2 | 12/2011 | Laforest et al. |
| 8,084,656 B2 | 12/2011 | Feldmann |
| 8,136,624 B2 | 3/2012 | Fullerton |
| 8,137,655 B2 | 3/2012 | Chornet et al. |
| 8,168,144 B2 | 5/2012 | Alyaser |
| 8,168,686 B2 | 5/2012 | Blevins et al. |
| 8,205,433 B2 | 6/2012 | Boespflug et al. |
| 8,302,377 B2 | 11/2012 | Rasheed et al. |
| 8,312,706 B2 | 11/2012 | Laforest et al. |
| 8,356,467 B2 | 1/2013 | Sprouse et al. |
| 8,381,527 B2 | 2/2013 | LaForest et al. |
| 8,539,752 B2 | 9/2013 | Brumgerg et al. |
| 8,580,152 B2 | 11/2013 | Sutradhar et al. |
| 8,585,789 B2 | 11/2013 | Sutradhar et al. |
| 8,707,674 B2 | 4/2014 | Moscinski et al. |
| 8,721,299 B2 | 5/2014 | Koch et al. |
| 8,726,800 B2 | 5/2014 | Murray et al. |
| 8,813,474 B2 | 8/2014 | Daniau et al. |
| 8,889,746 B2 | 11/2014 | Kresnyak |
| 8,894,885 B2 | 11/2014 | Bell et al. |
| 8,899,010 B2 | 12/2014 | Kenyon et al. |
| 8,955,303 B2 | 2/2015 | Brzek et al. |
| 8,968,433 B2 | 3/2015 | Chandran |
| 9,080,513 B2 | 7/2015 | Ziminsky et al. |
| 9,084,978 B2 | 7/2015 | Peters |
| 9,140,456 B2 | 9/2015 | Kenyon et al. |
| 9,217,569 B2 | 12/2015 | Prade |
| 9,227,790 B2 | 1/2016 | Perez |
| 9,268,048 B2 | 2/2016 | Fullerton |
| 9,279,503 B2 | 3/2016 | DiSalvo et al. |
| 9,359,973 B2 | 6/2016 | Farshchian et al. |
| 9,388,355 B2 | 7/2016 | Mennell et al. |
| 9,499,404 B2 | 11/2016 | Chandran et al. |
| 9,512,997 B2 | 12/2016 | Zettner |
| 9,550,950 B2 | 1/2017 | Chandran et al. |
| 9,738,579 B2 | 8/2017 | Lucas et al. |
| 10,344,232 B2 | 7/2019 | Lucas et al. |
| 10,344,233 B2 | 7/2019 | Lucas et al. |
| 10,704,002 B2 | 7/2020 | Lucas et al. |
| 10,760,018 B2 | 9/2020 | Tiverios et al. |
| 10,975,320 B2 | 4/2021 | Tiverios et al. |
| 11,098,258 B2 | 8/2021 | Tiverios et al. |
| 11,466,223 B2 | 10/2022 | Chandran et al. |
| 11,525,097 B2 | 12/2022 | Tiverios et al. |
| 11,655,426 B2 | 5/2023 | Tiverios et al. |
| 11,680,215 B2 | 6/2023 | Tiverios et al. |
| 11,760,949 B2 | 9/2023 | Chandran et al. |
| 2002/0066396 A1 | 6/2002 | Torii et al. |
| 2002/0142172 A1 | 10/2002 | Brinker et al. |
| 2003/0143126 A1 | 7/2003 | Samson |
| 2004/0182000 A1 | 9/2004 | Mansour et al. |
| 2005/0050759 A1 | 3/2005 | Chandran et al. |
| 2006/0117952 A1 | 6/2006 | Bancon et al. |
| 2006/0130444 A1 | 6/2006 | Smith et al. |
| 2006/0131235 A1 | 6/2006 | Offeman et al. |
| 2006/0246388 A1 | 11/2006 | Feese et al. |
| 2006/0251821 A1 | 11/2006 | Eidelman |
| 2007/0137435 A1 | 6/2007 | Orth et al. |
| 2007/0270511 A1 | 11/2007 | Melnichuk et al. |
| 2008/0023338 A1 | 1/2008 | Stoots et al. |
| 2008/0169449 A1 | 7/2008 | Mundschau |
| 2008/0178784 A1 | 7/2008 | Farone |
| 2008/0196308 A1 | 8/2008 | Hutton et al. |
| 2008/0222956 A1 | 9/2008 | Tsangaris et al. |
| 2008/0244976 A1 | 10/2008 | Paisley |
| 2008/0260629 A1 | 10/2008 | Morin et al. |
| 2008/0264254 A1 | 10/2008 | Song et al. |
| 2008/0282892 A1 | 11/2008 | Deckman et al. |
| 2008/0308769 A1 | 12/2008 | Marty et al. |
| 2009/0056537 A1 | 3/2009 | Neumann |
| 2009/0084035 A1 | 4/2009 | Wei |
| 2009/0084036 A1 | 4/2009 | Neumann |
| 2009/0084666 A1 | 4/2009 | Agrawal et al. |
| 2009/0139203 A1 | 6/2009 | Rasheed et al. |
| 2009/0151250 A1 | 6/2009 | Agrawal |
| 2009/0183431 A1 | 7/2009 | Smit et al. |
| 2009/0191104 A1 | 7/2009 | Murakami et al. |
| 2009/0217584 A1 | 9/2009 | Raman et al. |
| 2009/0229464 A1 | 9/2009 | Robertson |
| 2009/0232729 A1 | 9/2009 | Genkin et al. |
| 2009/0259082 A1 | 10/2009 | Deluga et al. |
| 2009/0299120 A1* | 12/2009 | Geers ................. C10L 3/10 585/815 |
| 2009/0300976 A1 | 12/2009 | Mansour et al. |
| 2009/0320446 A1 | 12/2009 | Gutmark et al. |
| 2010/0011955 A1 | 1/2010 | Hufton et al. |
| 2010/0011956 A1 | 1/2010 | Neumann et al. |
| 2010/0018115 A1 | 1/2010 | Wallace et al. |
| 2010/0024300 A1 | 2/2010 | Chornet et al. |
| 2010/0040510 A1 | 2/2010 | Randhava et al. |
| 2010/0051875 A1 | 3/2010 | Chornet et al. |
| 2010/0096594 A1 | 4/2010 | Dahlin et al. |
| 2010/0129691 A1 | 5/2010 | Dooher et al. |
| 2010/0158792 A1 | 6/2010 | Drnevich et al. |
| 2010/0162625 A1 | 7/2010 | Mills |
| 2010/0181539 A1 | 7/2010 | Apanel et al. |
| 2010/0196227 A1 | 8/2010 | Venderbosch et al. |
| 2010/0243961 A1 | 9/2010 | Hilton et al. |
| 2010/0270505 A1 | 10/2010 | Gallaspy et al. |
| 2010/0273899 A1 | 10/2010 | Winter |
| 2010/0307335 A1 | 12/2010 | Hayward |
| 2011/0031103 A1 | 2/2011 | Deckman et al. |
| 2011/0034569 A1 | 2/2011 | Basu et al. |
| 2011/0036014 A1 | 2/2011 | Tsangaris et al. |
| 2011/0047961 A1 | 3/2011 | Kenyon et al. |
| 2011/0047962 A1 | 3/2011 | Keynon et al. |
| 2011/0095233 A1 | 4/2011 | Hildebrandt et al. |
| 2011/0116986 A1 | 5/2011 | Balint et al. |
| 2011/0127469 A1 | 6/2011 | Chaubey et al. |
| 2011/0139603 A1 | 6/2011 | Booth |
| 2011/0146152 A1 | 6/2011 | Vimalchand et al. |
| 2011/0146285 A1 | 6/2011 | Glaser et al. |
| 2011/0152593 A1 | 6/2011 | Kelly et al. |
| 2011/0218254 A1 | 9/2011 | Chakravarti |
| 2011/0248218 A1 | 10/2011 | Sutradhar et al. |
| 2011/0250661 A1 | 10/2011 | Sutradhar et al. |
| 2011/0271883 A1 | 11/2011 | Chapman et al. |
| 2011/0297885 A1 | 12/2011 | Boerrigter et al. |
| 2012/0131901 A1 | 5/2012 | Westervelt et al. |
| 2012/0204814 A1 | 8/2012 | Zhang et al. |
| 2012/0213647 A1 | 8/2012 | Koch et al. |
| 2012/0238645 A1 | 9/2012 | Rüdlinger |
| 2012/0291351 A1 | 11/2012 | Bool et al. |
| 2013/0042595 A1 | 2/2013 | Rasheed et al. |
| 2013/0232873 A1 | 9/2013 | DePuy et al. |
| 2013/0306913 A1 | 11/2013 | Li et al. |
| 2013/0327629 A1 | 12/2013 | Palmas et al. |
| 2013/0345325 A1 | 12/2013 | Lecomte et al. |
| 2014/0054011 A1* | 2/2014 | Liu ................. C10K 3/005 165/104.11 |
| 2014/0158940 A1 | 6/2014 | Navaee-Ardeh et al. |
| 2014/0224706 A1 | 8/2014 | Do et al. |
| 2015/0005398 A1 | 1/2015 | Chakravarti et al. |
| 2015/0093664 A1 | 4/2015 | Berlowitz et al. |
| 2015/0376510 A1 | 12/2015 | Lucas et al. |
| 2016/0001304 A1 | 1/2016 | Pavel et al. |
| 2016/0102259 A1 | 4/2016 | Bool et al. |
| 2016/0137924 A1 | 5/2016 | Mazanec et al. |
| 2017/0058222 A1 | 3/2017 | Lucas et al. |
| 2017/0082067 A1 | 3/2017 | Maqbool |
| 2018/0290094 A1 | 10/2018 | Chandran et al. |
| 2018/0347810 A1 | 12/2018 | Chandran et al. |
| 2019/0309233 A1 | 10/2019 | Chandran et al. |
| 2019/0359902 A1 | 11/2019 | Chandran et al. |
| 2020/0392420 A1 | 12/2020 | Tiverios et al. |
| 2021/0284924 A1 | 9/2021 | Chandran et al. |
| 2022/0073829 A1 | 3/2022 | Chandran et al. |
| 2022/0081630 A1 | 3/2022 | Tiverios et al. |
| 2023/0071045 A1 | 3/2023 | Chandran et al. |

(56) References Cited

U.S. PATENT DOCUMENTS

| | | |
|---|---|---|
| 2023/0110311 A1 | 4/2023 | Tiverios et al. |
| 2023/0287286 A1 | 9/2023 | Tiverios et al. |

FOREIGN PATENT DOCUMENTS

| | | |
|---|---|---|
| CA | 2820091 | 2/2010 |
| CN | 2319410 | 5/1999 |
| DE | 4139512 | 6/1993 |
| EP | 0142364 A2 * | 5/1985 |
| EP | 1580253 | 9/2005 |
| EP | 2275513 | 1/2011 |
| EP | 2295526 | 3/2011 |
| GB | 1395953 | 5/1975 |
| JP | H1081886 A * | 3/1998 |
| JP | 2003336081 | 11/2003 |
| VN | 10012021 | 12/2013 |
| WO | WO 1993/023709 | 11/1993 |
| WO | WO 2000/069994 | 11/2000 |
| WO | WO 2003/013714 | 2/2003 |
| WO | WO 2006/071109 | 7/2006 |
| WO | WO 2006/100572 | 9/2006 |
| WO | WO 2007/117590 | 10/2007 |
| WO | WO 2008/130260 | 10/2008 |
| WO | WO 2009/002191 | 12/2008 |
| WO | WO 2010/049592 | 5/2010 |
| WO | WO 2010/096626 | 8/2010 |
| WO | WO 2010/124077 | 10/2010 |
| WO | WO 2011/008446 | 1/2011 |
| WO | WO 2011/084730 | 7/2011 |
| WO | WO 2012/138751 | 10/2012 |
| WO | WO 2012/158536 | 11/2012 |
| WO | WO 2013/043603 | 3/2013 |
| WO | WO 2013/067532 | 5/2013 |
| WO | WO 2013/078423 | 5/2013 |

OTHER PUBLICATIONS

U.S. Appl. No. 14/799,522, filed Jul. 14, 2015, Lucas et al.

[No Author], "Current MSW Industry Position and State-of-the-Practice on LFG Collection Efficiency, Methane Oxidation, and Carbon Sequestration in Landfills," SCS Engineers, Jan. 2009, 60 pages.

[No Author], "Methodology for Allocating Municipal Solid Waste to Biogenic and Non-Biogenic Energy," Energy Information Administration of the U.S. Department of Energy: Office of Coal, Nuclear, Electric and Alternate Fuels, May 2007, 18 pages.

[No Author], "The Role of Waste Incineration in Germany," Umweltbundesamt, Oct. 2008, 30 pages.

Björklund, "Environmental Systems Analysis of Waste Management—Experiences from Applications of the ORWARE Model," Doctoral Thesis, Royal Institute of Technology, Department of Chemical Engineering and Technology, Division of Industrial Ecology, Stockholm, Sweden, Dec. 2000, 66 pages.

Consonni et al., "Alternative strategies for energy recovery from municipal solid waste—Part B: Emission and cost estimates," Waste Management, 2005, 25(2):137-148.

Dave et al., "Plasma pyrolysis and gasification of plastic waste-a review," Journal of Scientific and Industrial Research, Mar. 2010, 69(3):177-179.

Fellner et al., "A New Method to Determine the Ratio of Electricity Production from Fossil and Biogenic Sources in Waste-to-Energy Plants," Environmental Science & Technology, Apr. 2007, 41(7):2579-2586.

Hall et al., "Installation and Operation of Sorbathene Solvent Vapor Recovery Units to Recover and Recycle Volatile Organic Compounds at Operating Sites Within the Dow Chemical Company," Proceedings from the Sixteenth National Industrial Energy Technology Converence, Houston, TX (Apr. 13-14, 1994).

International Preliminary Report on Patentability in International Appln. No. PCT/US2021/048986, dated Mar. 16, 2023, 10 pages.

International Search Report and Written Opinion in International Appln. No. PCT/US2021/048986, dated Feb. 14, 2022, 13 pages.

Larsen et al., "$CO_2$ emission factors for waste incineration: Influence from source separation of recyclable materials," Waste Management, Jul. 2011, 31(7):1597-1605.

Mponzi, "Production of Biofuels by Fischer Tropsch Synthesis," Master's Thesis, Lappeenranta University of Technology, Faculty of Chemical Technology, 2011, 94 pages.

Porteous, "Energy from waste incineration—a state of the art emissions review with an emphasis on public acceptability," Applied Energy, Oct. 2001, 70(2):157-167.

Séverin et al., "The biogenic content of process streams from mechanical-biological treatment plants producing solid recovered fuel. Do the manual sorting and selective dissolution determination methods correlate?," Waste Management, Jul. 2010, 30(7):1171-1182.

Thomas et al., "International expert group on life cycle assessment for integrated waste management," Journal of Cleaner Production, Feb. 2005, 13(3):321-326.

Zhang et al., "Gasification of municipal solid waste in the Plasma Gasification Melting process," Applied Energy, Feb. 2012, 90(1):106-112.

Extended Search Report in European Appln. No. 21865157.8, dated Feb. 1, 2024, 10 pages.

* cited by examiner

SYNGAS PRODUCTION SYSTEM

SYNGAS PRODUCTION SYSTEM
embodiment 1

SYNGAS PRODUCTION SYSTEM
embodiment 2

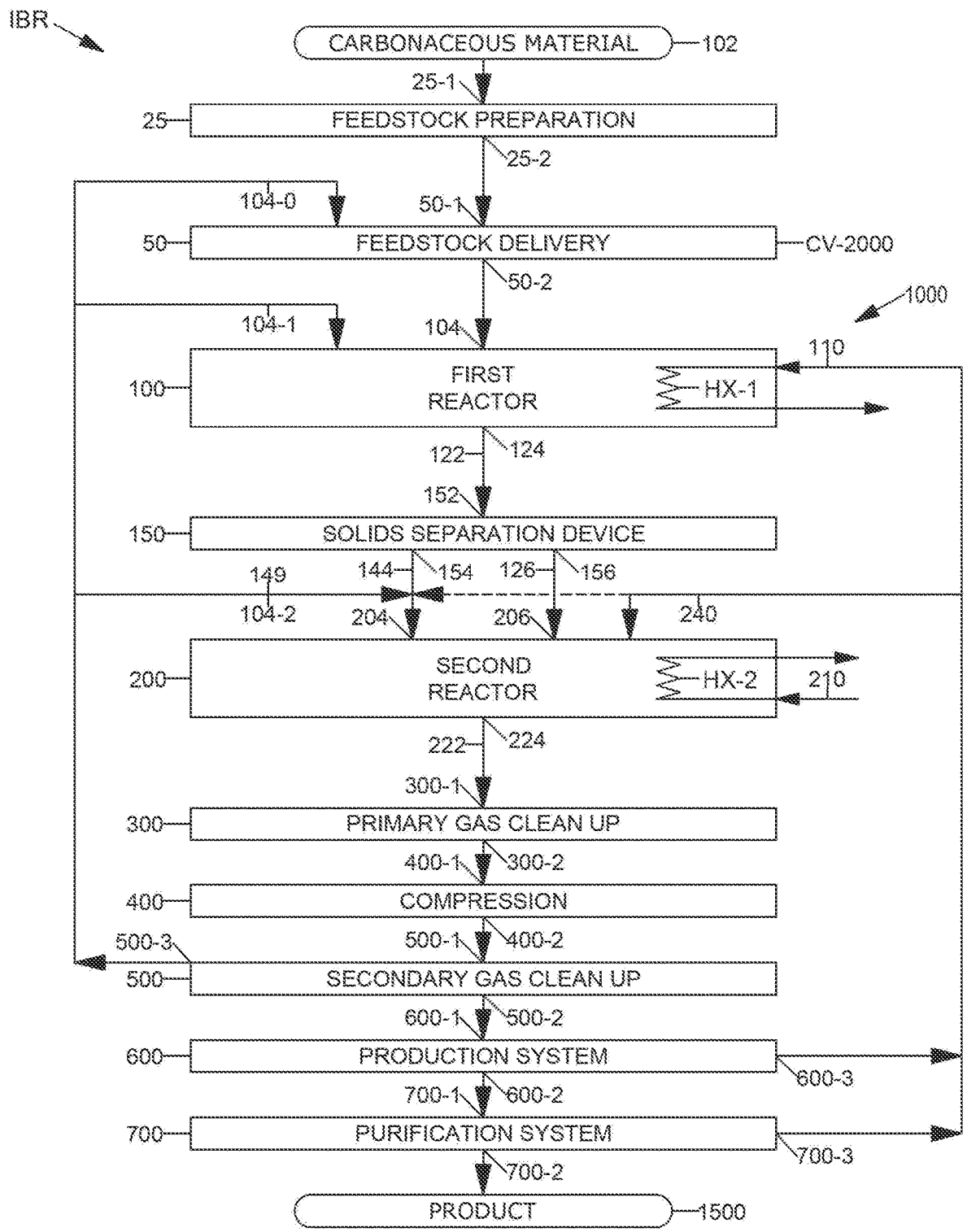

US 12,203,040 B2

TWO-STAGE SYNGAS PRODUCTION WITH SEPARATE CHAR AND PRODUCT GAS INPUTS INTO THE SECOND STAGE

CROSS-REFERENCE TO RELATED APPLICATIONS

This application is a continuation application of U.S. patent application Ser. No. 17/957,670 filed Sep. 30, 2022, which is a continuation application of, and claims priority to, U.S. patent application Ser. No. 17/012,901, for Two-Stage Syngas Production with Separate Char and Product Gas Inputs into the Second Stage, filed on Sep. 4, 2020, now U.S. Pat. No. 11,466,223. The disclosure of the foregoing application is incorporated here by reference.

TECHNICAL FIELD

The present disclosure is directed to methods to produce product gas from carbonaceous materials using a two-step thermochemical process.

BACKGROUND

In recent years, there has been a shift towards innovative energy and environmental technologies to moderate climate change, reduce greenhouse gas emissions, reduce air and water pollution, promote economic development, expand energy supply options, increase energy security, decrease dependence on imported oil, and strengthen rural economies.

One of these technologies entails conversion of a carbonaceous material into a product gas which can then be converted into liquid fuels, chemicals, renewable natural gas, hydrogen, hydrocarbons and other useful products. A product gas generation system is described which includes a first reactor, a solids separation device, and a second reactor, and is configured to convert a carbonaceous material into product gas. Carbonaceous material along with one or more gaseous or liquid reactants may be introduced into a pressurized reactor, or steam reformer, where they undergo one or more thermochemical reactions to produce a product gas including char. Ideally, the carbonaceous material is introduced into the reactor such that: feedstock throughput is high, the feedstock has high surface area to promote thermochemical reactions, the feedstock is distributed within the reactor, and the pressure of the reactor is maintained, even as the carbonaceous material is continuously being introduced into the reactor.

Char may be separated from the product gas to produce a char-depleted product gas, and both the separated char and char-depleted product gas may be introduced into a second reactor, or a char/hydrocarbon reformer. Within the second reactor, char is oxidized into carbon dioxide, carbon monoxide, and other gases, and hydrocarbons present within the char-depleted product gas are converted into additional product gas including hydrogen and carbon monoxide. Within the second reactor, reacting the oxygen-containing gas with the separated char to produce a combustion stream, and reacting the combustion stream with the char-depleted product gas to produce a final product gas, the final product gas having a reduced amount of char and a reduced amount of hydrocarbons, relative to the char-depleted product gas. This simple two-step thermochemical process is new and has advantages in that is reduces capital intensity, reduces physical outlay of the gasifier island of the integrated biorefinery, increases carbon intensity, and provides for a simple, cost-effective installation.

An Integrated Biorefinery (IBR) is described and is configured to convert a carbonaceous material into a useful intermediate and/or purified product, wherein the IBR includes a feedstock preparation system, a feedstock delivery system, the product gas production system, a primary gas clean-up system, a compression system, a secondary gas clean-up system, a production system, and a purification or upgrading system. In embodiments, the IBR may include a two-stage gasifier island and may be configured to produce and purify or upgrade products from large quantities of carbonaceous materials including jet fuel, gasoline, diesel, alcohols such as ethanol, mixed alcohols, methanol, dimethyl ether, chemicals or chemical intermediates (plastics, solvents, adhesives, fatty acids, acetic acid, carbon black, olefins, oxochemicals, ammonia, etc.), Fischer-Tropsch products (LPG, Naphtha, Kerosene/diesel, lubricants, waxes), or synthetic natural gas.

In some instances, the product gas discharged from the second reactor, or the char/hydrocarbon reformer, may be converted into hydrogen, synthetic natural gas, or power. Processing of large quantities of carbonaceous materials requires having sufficient throughput in each of a number of serially connected systems. The capacities of the various systems should be selected so that they collectively cooperate to meet up-time and fuel production requirements while also maximizing the return on investment (ROI).

SUMMARY

This Summary is provided merely to introduce certain concepts and not to identify any key or essential features of the claimed subject matter.

Paragraph A. A method of producing a final product gas from a carbonaceous material, comprising:
  in a first reactor, steam reforming the carbonaceous material to produce a first product gas including char, hydrogen, carbon monoxide, carbon dioxide, and hydrocarbons;
  in a solids separation device external to the first reactor, separating the char from the first product gas to produce separated char and char-depleted product gas, wherein the char-depleted product gas has a reduced amount of char relative to the first product gas;
  introducing into a second reactor, the separated char via a first char input and the char-depleted product gas via a product gas input distinct from the first char input;
  introducing an oxygen-containing gas into the second reactor; and
  in the second reactor, reacting the oxygen-containing gas with the separated char and the char-depleted product gas to produce a final product gas, the final product gas having a reduced amount of char and a reduced amount of hydrocarbons, relative to the char-depleted product gas;
  wherein:
  along a vertical axis of the second reactor, the separated char is introduced into the second reactor above the char-depleted product gas.

Paragraph B. The method according to Paragraph A, wherein the solids separation device comprises serially connected first and second cyclones; and the method comprises:
  passing the first product gas through both the first and second cyclones to produce the char-depleted product gas, with the first cyclone producing the separated char and the second cyclone producing additional char; and introducing, into the second reactor, the separated char via the first char input and the additional char via a second char input.

Paragraph C. The method according to Paragraph B, comprising:

introducing into the second reactor, both the separated char and the additional char above the char-depleted product gas.

Paragraph D. The method according to Paragraph A, wherein:

the hydrocarbons in the first product gas include low molecular weight hydrocarbons, aromatic hydrocarbons, and/or polyaromatic hydrocarbons; and the low molecular weight hydrocarbons include one or more selected from the group consisting of methane, ethane, ethylene, propane, propylene, butane, and butene.

Paragraph E. The method according to Paragraph A, comprising:

introducing a fuel to the second reactor; and reacting the oxygen-containing gas with the fuel using a burner in the second reactor.

Paragraph F. The method according to Paragraph E, wherein:

the fuel includes one or more selected from the group consisting of tail-gas, Fischer-Tropsch tail-gas, natural gas, conditioned syngas, propane, a methane-containing gas, naphtha, and off-gas from a liquid fuel upgrading unit.

Paragraph G. The method according to Paragraph A, comprising:

entraining the separated char in a motive fluid to produce a char and motive fluid mixture; and transferring the char and motive fluid mixture to the second reactor;

wherein: the motive fluid comprises one or more selected from the group consisting of a gas, carbon dioxide, nitrogen, tail-gas, conditioned syngas, syngas, off-gas from a downstream reactor, steam, superheated steam, a vapor, and a superheated vapor.

Paragraph H. The method according to Paragraph A, wherein: entraining the separated char in the motive fluid in an eductor to produce the char and motive fluid mixture.

Paragraph I. The method according to Paragraph A, comprising, in the first reactor:

indirectly heating particulate heat transfer material in the first reactor with a plurality of pulse combustion heat exchangers; and introducing superheated steam and the carbonaceous material into the first reactor to steam reform the carbonaceous material.

Paragraph J. The method according to Paragraph I, comprising:

also introducing an oxygen-containing gas into the first reactor to promote partial oxidation of the carbonaceous material to produce carbon monoxide and carbon dioxide.

Paragraph K. The method according to Paragraph A, wherein:

introducing additional oxygen-containing gas into the second reactor between the first char input and the product gas input along the vertical axis to promote partial oxidation of the char-depleted product gas, wherein the additional oxygen-containing gas.

Paragraph L. A method to produce a purified product from carbonaceous material, comprising:

producing a final product gas from the carbonaceous material according to Paragraph A after introducing the carbonaceous material into the first reactor from a feedstock delivery system;

in a primary gas clean-up system, cooling and removing solids and water vapor from the final product gas to produce a first cleaned product gas;

in a compression system, compressing the first cleaned product gas to produce a compressed product gas;

in a secondary gas clean-up system, removing contaminants and carbon dioxide from the compressed product gas to produce a second cleaned product gas and a carbon dioxide-rich stream;

in a production system, producing an intermediate product from at least a portion of the second cleaned product gas, the intermediate product includes one or more selected from the group consisting of liquid fuel, a chemical, ethanol, mixed alcohols, methanol, dimethyl ether, Fischer-Tropsch products, and synthetic natural gas; and in a purification system, purifying or upgrading the intermediate product to produce a purified product, wherein the purification system includes one or more selected from the group consisting of isomerization, hydrotreating, hydrocracking, distillation, and adsorption.

Paragraph M. The method according to Paragraph L, comprising:

recycling and mixing at least a portion of the carbon dioxide-rich stream removed in the secondary gas clean-up system with the char produced in Paragraph A to produce a mixture of char and carbon dioxide, and transferring the mixture of char and carbon dioxide to the first char input of the second reactor.

Paragraph N. The method according to Paragraph L, wherein:

in the production system, producing tail gas, and recycling and mixing at least a portion of the tail gas with the char produced in Paragraph A to produce a mixture of char and gas, and transferring the mixture of char and tail gas to the first char input of the second reactor.

Paragraph O. The method according to Paragraph L, wherein:

in the production system, producing tail-gas, and introducing at least a portion of the tail-gas to the second reactor, and reacting the tail-gas with the oxygen-containing gas prior to reaction with the char and/or the char-depleted product gas.

Paragraph P. The method according to Paragraph L, wherein:

in the purification system, producing an off-gas stream, and recycling and mixing at least a portion of the off-gas stream with the char produced in claim 1 to produce a mixture of char and gas, and transferring the mixture of mixture of char and gas to the first char input of the second reactor; and/or in the purification system, producing off-gas stream, and introducing at least a portion of the off-gas stream to the second reactor, and reacting the off-gas stream with the oxygen-containing gas prior to reaction with the char and/or the char-depleted product gas.

Paragraph Q. The method according to Paragraph L, wherein:

the first reactor comprises a cylindrical, up-flow, refractory-lined, steel pressure vessel including a fluidized bed; and the second reactor comprises a cylindrical, down-flow, non-catalytic, refractory-lined, steel pressure vessel.

Paragraph R. The method according to Paragraph L, wherein:
the carbonaceous material includes municipal solid waste; and
in a feedstock preparation system, processing the municipal solid waste to produce sorted municipal solid waste in at least one processing step, including one or more processing steps selected from the group consisting of large objects removal, recyclables removal, ferrous metal removal, size reduction, drying or water removal, biowaste removal, non-ferrous metal removal, polyvinyl chloride removal, glass removal, size reduction and pathogen removal; and
introducing the sorted municipal solid waste to the feedstock delivery system.

Paragraph S. The method according to Paragraph L, wherein:
in the production system, producing the intermediate product from at least a portion of the second cleaned product gas within one or more reactors selected from the group consisting of a multi-tubular reactor, a multi-tubular fixed-bed reactor, an entrained flow reactor, a slurry reactor, a fluid bed reactor, a circulating catalyst reactor, a riser reactor, a can reactor, a microchannel reactor, a fixed bed reactor, a bioreactor and a moving bed reactor.

Paragraph T. The method according to Paragraph S, wherein:
the reactor includes one or more bioreactors selected from the group consisting of a continuous stirred tank bioreactor, a bubble column bioreactor, a microbubble reactor, an airlift bioreactor, a fluidized bed bioreactor, a packed bed bioreactor and a photo-bioreactor.

Paragraph U. The method according to Paragraph T, wherein:
the bioreactor includes genetically modified organisms which undergo anaerobic respiration.

Paragraph V. A biorefinery system configured to produce a purified product from carbonaceous material, the system includes:
a feedstock delivery system configured to accept and transfer a source of carbonaceous material to a first reactor, wherein the feedstock delivery system includes one or more systems selected from the group consisting of a plug feeder system, a densification system, a lock-hopper system, a screw auger, and a solids transport conduit;
the first reactor configured to steam reform the carbonaceous material to produce a first product gas including char, hydrogen, carbon monoxide, carbon dioxide, and hydrocarbons;
a solids separation device configured to accept the first product gas and separate the char therefrom to produce separated char and char-depleted product gas, wherein the char-depleted product gas has a reduced amount of char relative to the first product gas;
a second reactor having a vertical axis and configured to accept both the separated char via a first char input and the char-depleted product gas via a product gas input, the first char input being at a higher elevation along the vertical axis than the product gas input, the second reactor configured to react the oxygen-containing gas with the separated char and the char-depleted product gas to produce a final product gas, the final product gas having a reduced amount of char and a reduced amount of hydrocarbons, relative to the char-depleted product gas;
a primary gas clean-up system configured to cool and removing solids and water vapor from the final product gas to produce a first cleaned product gas;
a compression system configured to compress the first cleaned product gas to produce a compressed product gas;
a secondary gas clean-up system configured to remove contaminants and carbon dioxide from the compressed product gas to produce a second cleaned product gas and a carbon dioxide-rich stream;
a production system configured to produce an intermediate product from at least a portion of the second cleaned product gas, the intermediate product includes one or more selected from the group consisting of liquid fuel, a chemical, ethanol, mixed alcohols, methanol, dimethyl ether, Fischer-Tropsch products, and synthetic natural gas; and
a purification system configured to purify the intermediate product to produce a purified product, wherein the purification system includes one or more selected from the group consisting of isomerization, hydrotreating, hydrocracking, distillation, and adsorption.

Paragraph W. The biorefinery system according to Paragraph V, wherein:
the second reactor includes a burner configured to react the oxygen-containing gas with a fuel.

Paragraph X. The biorefinery system according to Paragraph V, wherein:
the first reactor comprises a cylindrical, up-flow, refractory-lined, steel pressure vessel including a fluidized bed; and
the second reactor comprises a cylindrical, down-flow, non-catalytic, refractory-lined, steel pressure vessel.

Paragraph Y. The biorefinery system according to Paragraph V, further comprising:
an eductor configured to receive and entrain the separated char in a motive fluid, prior to introducing the char into the second reactor.

Paragraph Z. The biorefinery system according to Paragraph V, wherein:
the solids separation device comprises serially connected first and second cyclones through which the first product gas passes to remove char.

Paragraph AA. The biorefinery system according to Paragraph V, comprising:
a feedstock preparation system configured to accept a source of carbonaceous material comprising municipal solid waste and produce sorted municipal solid waste in at least one processing step, including one or more processing steps selected from the group consisting of large objects removal, recyclables removal, ferrous metal removal, size reduction, drying or water removal, biowaste removal, non-ferrous metal removal, polyvinyl chloride removal, glass removal, size reduction, and pathogen removal; and
the feedstock delivery system is configured to accept the sorted municipal solid waste from the feedstock preparation system as the source of carbonaceous material.

Paragraph AB. The biorefinery system according to Paragraph V, wherein:
the production system includes a reactor, the reactor includes one or more reactors selected from the group consisting of a multi-tubular reactor, a multi-tubular fixed-bed reactor, an entrained flow reactor, a slurry reactor, a fluid bed reactor, a circulating catalyst reactor, a riser reactor, a can reactor, a microchannel reactor, a fixed bed reactor, a bioreactor, and a moving bed reactor.

Paragraph AC. The biorefinery system according to Paragraph V, wherein:

the production system comprises bioreactor including one or more selected from the group consisting of a continuous stirred tank bioreactor, a bubble column bioreactor, a microbubble reactor, an airlift bioreactor, a fluidized bed bioreactor, a packed bed bioreactor, and a photo-bioreactor.

Paragraph AD. The biorefinery system according to Paragraph V, wherein:

the production system comprises bioreactor including one or more selected from the group consisting of a continuous stirred tank bioreactor, a bubble column bioreactor, a microbubble reactor, an airlift bioreactor, a fluidized bed bioreactor, a packed bed bioreactor, and a photo-bioreactor.

BRIEF DESCRIPTION OF THE DRAWINGS

The accompanying figures show schematic process flowcharts of preferred embodiments and variations thereof. A full and enabling disclosure of the content of the accompanying claims, including the best mode thereof to one of ordinary skill in the art, is set forth more particularly in the remainder of the specification, including reference to the accompanying figures showing how the preferred embodiments and other non-limiting variations of other embodiments described herein may be carried out in practice, in which:

FIG. 9 shows a simplistic diagram of one embodiment of Integrated Biorefinery (IBR) including the product gas production system (1000) as disclosed in FIGS. 1, 2 and 2A.

DETAILED DESCRIPTION

Notation and Nomenclature

Figure 1:
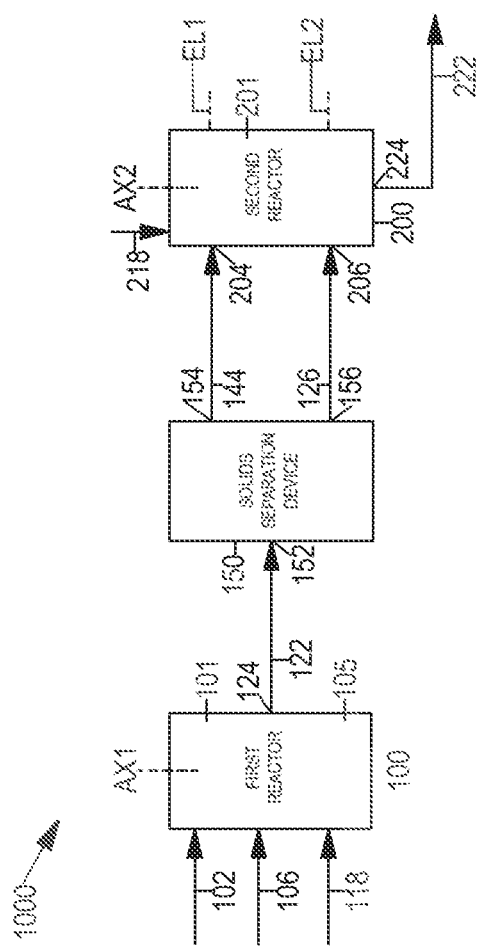
FIG. 1 shows a simplistic block flow diagram of one embodiment of a product gas production system (1000).

Before the disclosed systems and processes are described, it is to be understood that the aspects described herein are not limited to specific embodiments, apparatus, or configurations, and as such can, of course, vary. It is also to be understood that the terminology used herein is for the purpose of describing particular aspects only and, unless specifically defined herein, is not intended to be limiting.

As used herein the term "carbonaceous material" refers to a solid or liquid substance that contains carbon such as for instance, agricultural residues, agro-industrial residues, animal waste, biomass, cardboard, coal, coke, energy crops, farm slurries, fishery waste, food waste, fruit processing waste, lignite, municipal solid waste (MSW), paper, paper mill residues, paper mill sludge, paper mill spent liquors, plastics, refuse derived fuel (RDF), sewage sludge, tires, urban waste, wood products, wood wastes and a variety of others. All carbonaceous materials contain both "fixed carbon components" and "volatile components", such as for example woody biomass, MSW, or RDF.

As used herein the term "char" refers to a carbon-containing solid residue derived from a carbonaceous material and is comprised of the "fixed carbon components" of a carbonaceous material. Char includes carbon and ash.

As used herein the term "product gas" refers to syngas or flue gas discharged from a thermochemical reactor undergoing thermochemical processes including pyrolysis, steam reforming, partial oxidation, dry reforming, or combustion.

As used herein the term "syngas" refers to a mixture of carbon monoxide (CO), hydrogen ($H_2$), and other vapors/gases, also including char, if any and usually produced when a carbonaceous material reacts with steam ($H_2O$), carbon dioxide ($CO_2$) and/or oxygen ($O_2$). While steam is the reactant in steam reforming, $CO_2$ is the reactant in dry reforming. Generally, for operation at a specified temperature, the kinetics of steam reforming is faster than that of dry reforming and so steam reforming tends to be favored and more prevalent. Syngas might also include low molecular weight hydrocarbons (like methane, ethane, ethylene, propane, propylene, butane, butene, etc.), aromatic hydrocarbons such as volatile organic compounds (VOC) and/or semi-volatile organic compounds (SVOC).

As used herein the term "volatile organic compounds" or acronym "(VOC)" or "VOC" refer to aromatic hydrocarbons including benzene, toluene, phenol, styrene, xylene, and cresol.

As used herein the term "semi-volatile organic compounds" or acronym "(SVOC)" or "SVOC" refer to polyaromatic hydrocarbons, such as indene, indane, naphthalene, methylnaphthalene, acenaphthylene, acenaphthalene, anthracene, phenanthrene, (methyl-) anthracenes/phenanthrenes, pyrene/fluoranthene, methylpyrenes/benzofluorenes, chrysene, benz[a]anthracene, methylchrysenes, methylbenz[a]anthracenes, perylene, benzo[a]pyrene, dibenz[a,kl]anthracene, and dibenz[a,h]anthracene.

As used herein the term "oxygen-containing gas" refers to air, oxygen-enriched-air i.e. greater than 21 mole % $O_2$, or substantially pure oxygen, i.e. greater than about 95 mole % oxygen (the remainder usually comprising $N_2$ and/or rare gases). In embodiments, an air separation unit (ASU) is used to produce a source of "oxygen-containing gas" from air. In embodiments, a plurality of air separation unit (ASU) are used to produce a source of "oxygen-containing gas" from air.

In embodiments, the air separation unit (ASU) includes a fractional distillation unit. In embodiments, the air separation unit (ASU) includes a plurality of fractional distillation units. In embodiments, the air separation unit (ASU) includes a cryogenic air separation unit. In embodiments, the air separation unit (ASU) includes a plurality of cryogenic air separation units. In embodiments, the air separation unit (ASU) includes a membrane or a plurality of membranes. In embodiments, the air separation unit (ASU) includes a pressure swing adsorption (PSA) unit. In embodiments, the air separation unit (ASU) includes a plurality of pressure swing adsorption (PSA) units. In embodiments, the air separation unit (ASU) includes a vacuum pressure swing adsorption (VPSA) unit. In embodiments, the air separation unit (ASU) includes a plurality of vacuum pressure swing adsorption (VPSA) units. In embodiments, the air separation unit (ASU) includes one or more selected from the group consisting of a fractional distillation unit, cryogenic air separation unit, a membrane, a pressure swing adsorption (PSA) unit, a vacuum pressure swing adsorption (VPSA) unit. In embodiments, the air separation unit (ASU) includes two or more selected from the group consisting of a fractional distillation unit, cryogenic air separation unit, a membrane, a pressure swing adsorption (PSA) unit, a vacuum pressure swing adsorption (VPSA) unit.

As used herein the term "flue gas" refers to a vapor or gaseous mixture containing varying amounts of nitrogen ($N_2$), carbon dioxide ($CO_2$), water ($H_2O$), and oxygen ($O_2$). Flue gas is generated from the thermochemical process of combustion.

As used herein the term "thermochemical process" refers to a broad classification including various processes that can convert a carbonaceous material into product gas. Among the numerous thermochemical processes or systems that can be considered for the conversion of a carbonaceous material, the present disclosure contemplates: pyrolysis, steam reforming, partial oxidation, dry reforming, and/or combustion. Thermochemical processes may be either endothermic or exothermic in nature depending upon the specific set of processing conditions employed. Stoichiometry and composition of the reactants, type of reactants, reactor temperature and pressure, heating rate of the carbonaceous material, residence time, carbonaceous material properties, and catalyst or bed additives all dictate what sub classification of thermochemical processing the system exhibits.

As used herein the term "thermochemical reactor" refers to a reactor (e.g., a first reactor, a second reactor) that accepts a carbonaceous material, char, low molecular weight hydrocarbons, VOC, SVOC, or product gas and converts it into one or more product gases.

Pyrolysis Reaction:

As used herein the term "pyrolysis" is the endothermic thermal degradation reaction that organic material goes through in its conversion into a more reactive liquid/vapor/gas state.

Carbonaceous material+heat→VOC+SVOC+$H_2O$+ CO+$CO_2$+$H_2$+$CH_4$+low molecular weight hydrocarbons+char Steam Reforming Reactions:

As used herein the term "steam reforming" refers to a thermochemical process where steam reacts with a carbonaceous material to yield syngas. The main reaction is endothermic (consumes heat) wherein the operating temperature range is between 570° C. and 900° C. (1,058° F. and 1,652° F.), depending upon the chemistry of the carbonaceous material.

$H_2O+C+Heat \rightarrow H_2+CO$

Water Gas Shift Reaction:

As used herein the term "water-gas shift" refers to a thermochemical process comprising a specific chemical reaction that occurs simultaneously with the steam reforming reaction to yield hydrogen and carbon dioxide. The main reaction is exothermic (releases heat) wherein the operating temperature range is between 570° C. and 900° C. (1,058° F. and 1,652° F.), depending upon the chemistry of the carbonaceous material.

$H_2O+CO \rightarrow H_2+CO_2+Heat$

Dry Reforming Reaction:

As used herein the term "dry reforming" refers to a thermochemical process comprising a specific chemical reaction where carbon dioxide is used to convert a carbonaceous material into carbon monoxide. The reaction is endothermic (consumes heat) wherein the operating temperature range is between 600° C. and 1,000° C. (1,112° F. and 1,832° F.), depending upon the chemistry of the carbonaceous material.

$CO_2+C+Heat \rightarrow 2CO$

Partial Oxidation Reaction:

As used herein the term "partial oxidation" refers to a thermochemical process wherein substoichiometric oxidation of a carbonaceous material takes place to exothermically produce carbon monoxide, carbon dioxide and/or water vapor. The reactions are exothermic (release heat) wherein the operating temperature range is between 500° C. and 1,700° C. (932° F. and 3,092° F.), depending upon the chemistry of the carbonaceous material. Oxygen reacts exothermically (releases heat): 1) with the carbonaceous material to produce carbon monoxide and carbon dioxide; 2) with hydrogen to produce water vapor; and 3) with carbon monoxide to produce carbon dioxide.

$4C+3O_2 \rightarrow CO+CO_2+Heat$ $C+½O_2 \rightarrow CO+Heat$ $$H_2 + \tfrac{1}{2}O_2 \rightarrow H_2O + \text{Heat}$$

$$CO + \tfrac{1}{2}O_2 \rightarrow CO_2 + \text{Heat}$$

Combustion Reaction:

As used herein the term "combustion" refers to an exothermic (releases heat) thermochemical process wherein at least the stoichiometric oxidation of a carbonaceous material takes place to generate flue gas.

$$C + O_2 \rightarrow CO_2 + \text{Heat}$$

$$CH_4 + O_2 \rightarrow CO_2 + 2H_2O + \text{Heat}$$

Some of these reactions are fast and tend to approach chemical equilibrium while others are slow and remain far from reaching equilibrium. The composition of the product gas will depend upon both quantitative and qualitative factors. Some are unit specific i.e. reactor size/scale specific and others are carbonaceous material feedstock specific. The quantitative parameters are: carbonaceous material properties, carbonaceous material injection flux, reactor operating temperature, pressure, gas and solids residence times, carbonaceous material heating rate, fluidization medium and fluidization flux; the qualitative factors are: degree of bed mixing and gas/solid contact, and uniformity of fluidization and carbonaceous material injection.

Reference will now be made in detail to various embodiments of the disclosure. Each embodiment is provided by way of explanation of the disclosure, not limitation of the disclosure. In fact, it will be apparent to those skilled in the art that modifications and variations can be made in the disclosure without departing from the teaching and scope thereof. For instance, features illustrated or described as part of one embodiment to yield a still further embodiment derived from the teaching of the disclosure. Thus, it is intended that the disclosure or content of the claims cover such derivative modifications and variations to come within the scope of the disclosure or claimed embodiments described herein and their equivalents.

Additional objects and advantages of the disclosure will be set forth in part in the description which follows, and in part will be obvious from the description, or may be learned by practice of the claims. The objects and advantages of the disclosure will be attained by means of the instrumentalities and combinations and variations particularly pointed out in the appended claims.

FIG. 1:

FIG. 1 shows a simplistic diagram of one embodiment of a product gas production system (1000). The product gas production system (1000) of FIG. 1 includes a first reactor (100), a solids separation device (150), and a second reactor (200).

In embodiments, the first reactor (100) includes a first interior (101) and has a first vertical axis (AX1). In embodiments, the second reactor (200) includes a second interior (201) and has a second vertical axis (AX2). The first reactor (100) generates a first product gas (122) by reacting a source of carbonaceous material (102) with a reactant (106), such as superheated steam, in a steam reforming reaction, wherein the first product gas (122) includes syngas comprising hydrogen, carbon monoxide, carbon dioxide, low molecular weight hydrocarbons, volatile organic compounds, semi-volatile organic compounds, and char. In embodiments, the second reactor includes a char/hydrocarbon reformer.

A particulate heat transfer material (105) is contained within the interior (101) of the first reactor (100) and is configured to provide contact with the carbonaceous material (102) and a reactant (106), such as steam, superheated steam, and optionally carbon dioxide (recycled from downstream secondary gas clean-up section of the Integrated Biorefinery (IBR) as shown in FIG. 9). In embodiments, the product gas production system (1000) is included inside of an Integrated Biorefinery (IBR).

In embodiments, the particulate heat transfer material (105) is comprised of alumina, zirconia, sand, olivine sand, limestone, dolomite, or catalytic materials, any of which may be hollow in form, such as microballoons or microspheres. In embodiments, a first oxygen-containing gas (118) is provided to the interior (101) of the first reactor (100) to react with the carbonaceous material (102). In embodiments, a source of carbon dioxide is provided to the first reactor (100) together with the source of carbonaceous material (102), wherein the carbonaceous material (102) includes a mixture of carbonaceous material and carbon dioxide. In embodiments, the particulate heat transfer material (105) enhances mixing, heat and mass transfer, and reaction between the carbonaceous material (102), reactant (106), and the first oxygen-containing gas (118) within the interior (101) for the first reactor (100).

The first product gas (122) is discharged from the first reactor (100) via a first product gas output (124) and is routed towards a solids separation device (150) which separates the char (144) from the first product gas (122) to produce separated char (144) and char-depleted product gas (126). The char-depleted product gas (126) has a reduced amount of char (144) within it relative to the first product gas (122).

The solids separation device (150) accepts the first product gas (122) via a first separation input (152). The solids separation device (150) accepts the first product gas (122) from the first product gas output (124) of the first reactor (100). The solids separation device (150) includes any conceivable means to separate solid char from the first product gas, and preferably includes a cyclone, a filter, or a separator. The char-depleted product gas (126) is discharged from the solids separation device (150) via the first separation gas output (156). The separated char (144) is discharged from the solids separation device (150) via the first separation char output (154).

The second reactor (200) is configured to accept both the separated char (144) and the char-depleted product gas (126) discharged from the solids separation device (150). The separated char (144) is introduced to the interior (201) of the second reactor (200) via a first char input (204). The char-depleted product gas (126) is introduced to the interior (201) of the second reactor (200) via a product gas input (206).

In embodiments, the first char input (204) is positioned at a first elevation (EL1) along the second vertical axis (AX2) of the second reactor (200). In embodiments, the product gas input (206) is positioned at a second elevation (EL2) along the second vertical axis (AX2) of the second reactor (200). In embodiments, the first char input (204) at the first elevation (EL1) is higher than the second elevation (EL2) of the product gas input (206). In embodiments, the separated char (144) is introduced to the interior (201) of the second reactor (200) at an elevation higher than where the product gas input (206) is introduced to the interior (201) of the second reactor (200).

The separated char (144) and the char-depleted product gas (126) are both reacted within the interior (201) of the second reactor (200) to produce a second reactor product gas (222). The second reactor product gas (222) is discharged from the second reactor (200) via a second product gas output (224). In embodiments, the second reactor product gas (222) is a final product gas resulting from this new two-step thermochemical process. The separated char (144) is reacted with a second oxygen-containing gas (218) within the interior (201) of the second reactor (200) to produce carbon monoxide and/or carbon dioxide. The char-depleted product gas (126) is reacted with a second oxygen-containing gas (218) and the products of the char reaction within the interior (201) of the second reactor (200) to produce additional product gas, or additional syngas, not only including hydrogen, carbon monoxide, and carbon dioxide. The char-depleted product gas (126) is reacted with a second oxygen-containing gas (218) within the interior (201) of the second reactor (200) to produce an improved syngas having a higher concentration of carbon monoxide and hydrogen, relative to that found in the char-depleted product gas (126).

Figure 2:
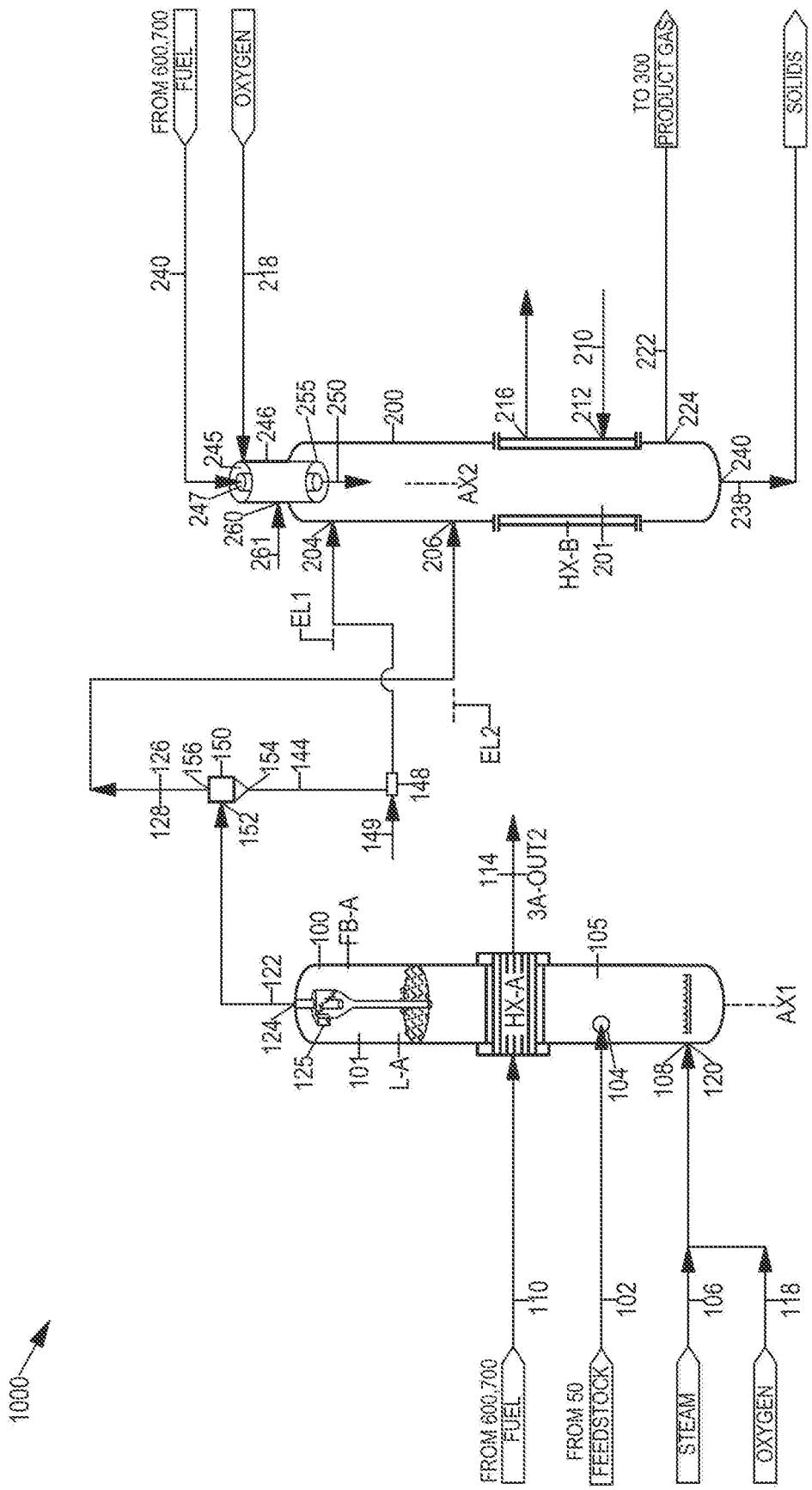
FIG. 2 shows a simplistic block flow diagram of one embodiment of a product gas production system (1000) including: a first reactor (100) configured to produce a first product gas (122) including char, a solids separation device (150) configured to separate the char from the first product gas (122) to produce separated char (144) and char-depleted product gas (126), and a second reactor (200) configured to separately accept both the separated char (144) and the char-depleted product gas (126), wherein the separated char (144) is introduced to the second reactor at a first elevation (EL1) and the char-depleted product gas (126) at a second elevation (EL2), wherein the first elevation is higher than the second elevation along a vertical axis (AX2) of the second reactor (200).

FIG. 2:

FIG. 2 shows a simplistic diagram of one embodiment of a product gas production system (1000) including: a first reactor (100) configured to produce a first product gas (122) including char, a solids separation device (150) configured to separate the char from the first product gas (122) to produce separated char (144) and char-depleted product gas (126), and second reactor (200) configured to separately accept both the separated char (144) and the char-depleted product gas (126), wherein the separated char (144) is introduced to the second reactor at a first elevation (EL1) and the char-depleted product gas (126) at a second elevation (EL2), wherein the first elevation is higher than the second elevation along a vertical axis (AX2) of the second reactor (200).

The product gas production system (1000) of FIG. 2 includes a more detailed view of the first reactor (100), a solids separation device (150), and a second reactor (200) as depicted in FIG. 1. In embodiments, the first reactor (100) includes a first interior (101) and has a first vertical axis (AX1). In embodiments, the second reactor (200) includes a second interior (201) and has a second vertical axis (AX2).

FIG. 2 shows a carbonaceous material (102) being introduced to the interior (101) of the first reactor (100) via an input (104). In the first reactor (100) the source of carbonaceous material (102) is steam reformed, via a steam reforming reaction, to produce the first product gas (122) including syngas comprising hydrogen, carbon monoxide, carbon dioxide, low molecular weight hydrocarbons, volatile organic compounds, semi-volatile organic compounds, and char.

A particulate heat transfer material (105) is contained within the interior (101) first reactor (100) and is configured to provide contact with the carbonaceous material (102) and a reactant (106), such as steam, superheated steam, and optionally carbon dioxide (recycled from downstream secondary gas clean-up section of the Integrated Biorefinery (IBR) as shown in FIG. 9).

A first reactor heat exchanger (HX-1) is immersed beneath a fluid bed level (L-1) of the particulate heat transfer material (105). The first reactor heat exchanger (HX-1) may include a plurality of heat exchangers, such as pulse combustion heat exchangers. Any type of heat exchanger may be used, such as pulse heater tailpipes, electrical heater rods in thermowells, fuel cells, heat pipes, fire-tubes, annulus-type heat exchangers, or radiant tubes.

In embodiments, the first reactor heat exchanger (HX-1) may be a pulse combustion heat exchanger that combusts a source of fuel (110) to form a pulse combustion stream (114) comprising flue gas. The pulse combustion stream (114) indirectly heats the particulate heat transfer material (105) of the first reactor (100). As used herein, indirectly heating the particulate heat transfer material (105) means that the pulse combustion stream (114) does not contact the contents of the particulate heat transfer material (105) within the first reactor (100). In other words, the pulse combustion stream (114) indirectly heats the particulate heat transfer material (105) which in turn directly contacts the carbonaceous material (102), reactant (106), and the first oxygen-containing gas (118) within the interior (101) of the first reactor (100). In embodiments, the fuel for the plurality of pulse combustion heat exchangers includes one or more selected from the group consisting of conditioned syngas, tail-gas, Fischer Tropsch tail-gas, naphtha, off-gases from a downstream liquid fuel production system, natural gas, steam-diluted natural gas, propane, hydrocarbons, and hydrocarbon mixtures.

In embodiments, the particulate heat transfer material (105) is comprised of alumina, zirconia, sand, olivine sand, limestone, dolomite, or catalytic materials, any of which may be hollow in form, such as microballoons or microspheres. In embodiments, the particulate heat transfer material (105) enhances mixing, heat and mass transfer, and reaction between the carbonaceous material (102), reactant (106), and the first oxygen-containing gas (118). In embodiments, the first reactor includes a steam reformer. In embodiments, the first reactor includes an indirectly heated steam reformer.

In embodiments, a first oxygen-containing gas (118) is provided to the interior (101) of the first reactor (100) via a first oxygen-containing gas input (120) to react with the carbonaceous material (102). In embodiments, a reactant (106), such as steam, or superheated steam, a vapor, or a superheated vapor, is provided to the interior (101) of the first reactor (100) via a reactant input (108) to react with the carbonaceous material (102). In embodiments, the first oxygen-containing gas input (120) and the reactant input (108) are not separate inputs to the first reactor (100), and are introduced to the first reactor (100) as a mixture of the reactant (106) and the first oxygen-containing gas (118), and are introduced to the interior (101) of the first reactor (100) through a fluidization distributor (121) to fluidize particulate heat transfer (105) included therein, as shown in FIG. 2. In embodiments, the first oxygen-containing gas input (120) and the reactant input (108) are separate inputs to the first reactor (100).

FIG. 2 shows a first reactor (100) having a first interior (101) provided with a freeboard zone (FB-1) located above the fluid bed level (L-1) of the particulate heat transfer material (105). In embodiments, an internal cyclone (125) is positioned within the freeboard zone (FB-1) of the first reactor (100). The internal cyclone (125) is configured to separate particulate heat transfer material (105) from, product gas within the freeboard zone (FB-1) of the first reactor (100) and return the particulate heat transfer material (105) back to below the fluid bed level (L-1) while permitting the product gas to leave the interior (101) of the first reactor (100) en route to the solids separation device (150).

The first product gas (122) is discharged from the first reactor (100) via a first product gas output (124) and is routed towards a solids separation device (150) which separates the char (144) from the first product gas (122) to produce separated char (144) and a char-depleted product gas (126), wherein the char-depleted product gas (126) has a reduced amount of char (144) within it relative to the first product gas (122).

The solids separation device (150) accepts the first product gas (122) via a first separation input (152). The solids separation device (150) accepts the first product gas (122) from the first product gas output (124) of the first reactor (100). The solids separation device (150) includes any conceivable means to separate solid char from the first product gas, and preferably includes a cyclone, a filter, or a separator. The char-depleted product gas (126) is discharged from the solids separation device (150) via the first separation gas output (156). The separated char (144) is discharged from the solids separation device (150) via the first separation char output (154).

In embodiments, a source of motive fluid (149), such as carbon dioxide, a gas such as conditioned syngas or tail-gas or off-gas from a downstream reactor, steam, superheated steam, a vapor, a superheated vapor, is mixed with the separated char (144) for transporting the separated char (144) to the first char input (204) of the second reactor (200). In embodiments, the motive fluid with mixed with or entrains the separated char to produce a char and motive fluid mixture, and then transferring the char and motive fluid mixture to the second reactor for reaction with an oxygen-containing gas, wherein: the motive fluid comprises one or more selected from the group consisting of a gas, carbon dioxide, nitrogen, tail-gas, conditioned syngas, syngas, off-gas from a downstream reactor, steam, superheated steam, a vapor, and a superheated vapor.

In embodiments, an eductor (148) is used to mix and transport the motive fluid (149) with the separated char (144) to be transferred to the first char input (204) of the second reactor (200). In embodiments, the eductor (148) may include a venturi eductor and/or a venturi transport system for dilute phase pneumatic conveying of the char (144) into the second reactor (200) with the motive fluid (148). In embodiments, the eductor (148) includes a Solids Handling Eductor provided by Schutte & Koerting located at 2510 Metropolitan Drive, Trevose, PA 19053 (www.s-k.com).

The second reactor (200) is configured to accept both the separated char (144) and the char-depleted product gas (126) discharged from the solids separation device (150). The separated char (144) is introduced to the interior (201) of the second reactor (200) via a first char input (204). The char-depleted product gas (126) is introduced to the interior (201) of the second reactor (200) via a product gas input (206). The solids separation device (150) separates the char from the first product gas (122) to provide two separate streams, the separated char (144) and the char-depleted product gas (126), which are then separately introduced to the interior (201) of the second reactor (201) at two different reaction zones. The kinetics of reacting the separated char (144) into additional product gas are much slower than reacting char-depleted product gas (126) into additional product gas. This difference in reaction kinetics is the main reason for first introducing the separated char (144) into a higher region of the second reactor (200) followed by secondly introducing the char-depleted product gas (126) into a relatively lower region of the second reactor (200).

In embodiments, the first char input (204) is positioned at a first elevation (EL1) along the second vertical axis (AX2) of the second reactor (200). In embodiments, the product gas input (206) is positioned at a second elevation (EL2) along the second vertical axis (AX2) of the second reactor (200). In embodiments, the first char input (204) at the first elevation (EL1) is higher than the second elevation (EL2) of the product gas input (206). In embodiments, the first char input (204) is higher than the product gas input (206) along the second vertical axis (AX2) of the second reactor (200). In embodiments, the separated char (144) is introduced to the interior (201) of the second reactor (200) at an elevation higher than where the product gas input (206) is introduced to the interior (201) of the second reactor (200). The separated char (144) and the char-depleted product gas (126) are both reacted within the interior (201) of the second reactor (200) to produce a second reactor product gas (222).

In embodiments, a second reactor heat exchanger (HX-2) is in thermal contact with the interior (201) of the second reactor (200). In embodiments, the second reactor heat exchanger (HX-2) may include a radiant syngas cooler. In embodiments, the second reactor heat exchanger (HX-2) may include radiant syngas cooler with a double shell design or a membrane wall. In embodiments, the second reactor heat exchanger (HX-2) is configured to remove heat from within the interior (201) of the second reactor (200) by use of a heat transfer medium (210). In embodiments, the heat transfer medium (210) enters the second reactor heat exchanger (HX-2) via a heat transfer medium inlet (212) and exits via a heat transfer medium outlet (216). The heat transfer medium (210) leaving the second reactor heat exchanger (HX-2) via the heat transfer medium outlet (216) is at a higher temperature than the heat transfer medium (210) entering the second reactor heat exchanger (HX-2) via the heat transfer medium inlet (212).

The second reactor product gas (222) is discharged from the interior (201) of the second reactor (200) via a second product gas output (224). In embodiments, solids (338), such as ash, molten ash, slag are discharged from the interior (201) of the second reactor (200) via a solids output (340).

In embodiments, the first reactor (100) may be a cylindrical, up-flow, catalytic, refractory-lined, steel pressure vessel with a fluidized bed. In embodiments, the first reactor (100) may be a cylindrical, up-flow, non-catalytic, refractory-lined, steel pressure vessel with a fluidized bed. In embodiments, the second reactor (200) may be a cylindrical, down-flow, non-catalytic, refractory-lined, steel pressure vessel. In embodiments, the second reactor (200) may be rectangular.

In embodiments, a sufficient amount of oxygen-containing gas (218) is provided to a burner (246) of the second reactor (200) so that excess oxygen-containing gas (218) remains unreacted and exits the burner (246) and thus is also available to react the separated char (144) and/or the char-depleted product gas (126). In embodiments, the separated char (144) may either be the primary or secondary fuel that reacts with the oxygen-containing gas (118). Herein, the oxygen-containing gas (218) may be staged and the flow streams swirled as necessary to manage the mixing, stoichiometry, flame length, and temperature.

Oxidation or combustion, or partial oxidation, of a source of fuel (240) occurs within the burner (246) where the fuel (240) is reacted with the oxygen-containing gas (218) to generate a combustion stream (250). In embodiments, the oxygen-containing gas (218) is introduced to the burner (246) in superstoichiometric amounts in proportion and relative to the fuel (240) so as to substantially, completely combust the fuel (240) to generate carbon dioxide and heat along with an unreacted amount of oxygen-containing gas (218). In embodiments, a superstoichiometric amount of oxygen is provided to the burner (246) so that when all of the fuel (240) is burned, there is still excess oxygen-containing gas (218) left over. In embodiments, the combustion stream (250) exits the burner (246) in substoichiometric amounts in proportion and relative to the char (144) and/or the char-depleted product gas so as to substantially, completely react the char and/or the low molecular weight hydrocarbons, volatile organic compounds, semi-volatile organic compounds present within the char-depleted product gas to produce carbon monoxide.

In embodiments, the fuel (240) may be tail-gas from a downstream reactor, Fischer Tropsch tail-gas, natural gas, propane, a methane-containing gas, naphtha, conditioned syngas, product gas, off-gas from a downstream reactor, or even landfill gas including a complex mix of different gases created by the action of microorganisms within a landfill. The char-depleted product gas (126) is reacted with the combustion stream (250) exiting the burner (246) to produce additional carbon monoxide and hydrogen.

In embodiments, the burner (246) is an annulus type burner employed to react the fuel (240) with the oxygen-containing gas (218) through the thermochemical process of combustion. In embodiments, the burner (246) is a multi-orifice, co-annular, burner provided with an arrangement of several passages coaxial with the longitudinal axis of the burner. Multi-orifice burners comprising arrangements of annular concentric channels for reacting the oxygen-containing gas (218) with the fuel (240) may, in some instances, have a reduced area to permit a high velocity stream to take place and result in very rapid and complete reaction of the combustion stream (250) with the separated char (144) and/or the char-depleted product gas (126) to produce additional carbon monoxide. The design of the burner (246) is not particularly relevant in FIG. 2. Various types of burners may be used as disclosed in FIGS. 3 to 8. Preferably, a burner (246) is selected that is configured to react either a combustible fuel (240) or separated char (144) or a mixture thereof with an oxygen-containing gas (218) via combustion reaction to produce an intensely hot combustion stream (250) comprising carbon dioxide, oxygen, and heat. The burner may be equipped with an ignitor.

FIG. 2 shows the burner (246) is that of an annulus type. In embodiments, the burner (246) may be of the type configured to accept the fuel (240) and the oxygen-containing gas (218) through concentric ports, wherein the oxygen-containing gas (218) is injected into an annular port (245), and the fuel (240) is injected to the central port (247). The burner (246) ensures rapid and intimate mixing and combustion of the fuel (240) with the oxygen-containing gas (218). The fuel (240) and the oxygen-containing gas (218) are introduced under pressure and combustion of the fuel (240) is completed in the burner (246) and terminates at the burner nozzle (255). In embodiments, the burner (246) is constructed such that the reaction between the fuel (240) and the oxygen-containing gas (218) takes place entirely outside the burner (246) and only at the burner nozzle (247) so as to provide protection of the burner (246) from overheating and from direct oxidation. In embodiments, the burner (246) or the burner nozzle (247) is equipped with a cooling water circuit (260) which circulates a source of cooling water (261) within a portion of the burner (246).

In embodiments, the burner nozzle (247) may be defined by a restriction constituting a reduction in area to provide an increase in velocity of the combustion stream (250) exiting the burner nozzle (247). The restriction may even be in some instances a baffle or an impingement plate on which the flame of the combustion stream is stabilized. The burner nozzle (247) may have a restricting or constricting throat zone, or orifice to accelerate velocity of the combustion stream (250) in the transition from the combustion zone to the interior (201) of the second reactor (200) where reaction of the combustion stream (250) and the separated char (144) and/or the char-depleted product gas (126) takes place. A restriction, orifice, baffle, or impingement surface is advantageous to shield the combustion occurring within the burner (246) from pressure fluctuations within the interior (201) of the second reactor (200) to mediate operational difficulties such as burner oscillation, flash-back, detonation, and blow-out.

In embodiments, combustion stream (250) exiting the burner nozzle (247) may be transferred at velocities within the range of 200 feet per minute (ft/m) to the speed of sound under the existing conditions. But advantageously the combustion stream (250) that is discharged from the burner (246), via the burner nozzle (247), is at a velocity between 50 and 500 feet per second (ft/s) and typically less than 300 ft/s.

The separated char (144) and/or the char-depleted product gas (126) introduced to the interior (201) of the second reactor (200) which come into contact with the combustion stream (250) must not be allowed to remain at high temperatures for more than a fraction of a second, or more than a few seconds, the critical reaction period limits being about 0.1 second to about 10 seconds. Normally it is advantageous to maintain reaction time between the separated char (144) and/or the char-depleted product gas (126) and the combustion stream (250) of 1 to 6 seconds to sufficiently completely react the low molecular weight hydrocarbons, SVOC, VOC, and char into additional hydrogen and carbon monoxide and products of combustion. Preferably the residence time of the separated char (144) and/or the char-depleted product gas (126) and the combustion stream (250) in the reaction zone is about 4 seconds.

The combustion stream (250) discharged from burner (246) is comprised of an intensely hot mixture of carbon dioxide and excess oxygen-containing gas. The heat generated between the combustion of the fuel (240) with the oxygen-containing gas (218) in turn elevates the temperature of the excess unreacted oxygen-containing gas (218) contained within the combustion stream (250) to a temperature up to 1,500° C. (2,732° F.). It is preferred to operate the burner (246) at about 1,300° C. (2,372° F.). In embodiments, the combustion stream (250) exiting the burner (246) operates at a temperature ranging from about 1,000° C. (1,832° F.) to 1,700° C. (3,092° F.). In embodiments, a nozzle (255) comprising a baffle or impingement plate might be installed to shield the burner (246) from the interior (201) of the second reactor (200).

Figure 7:
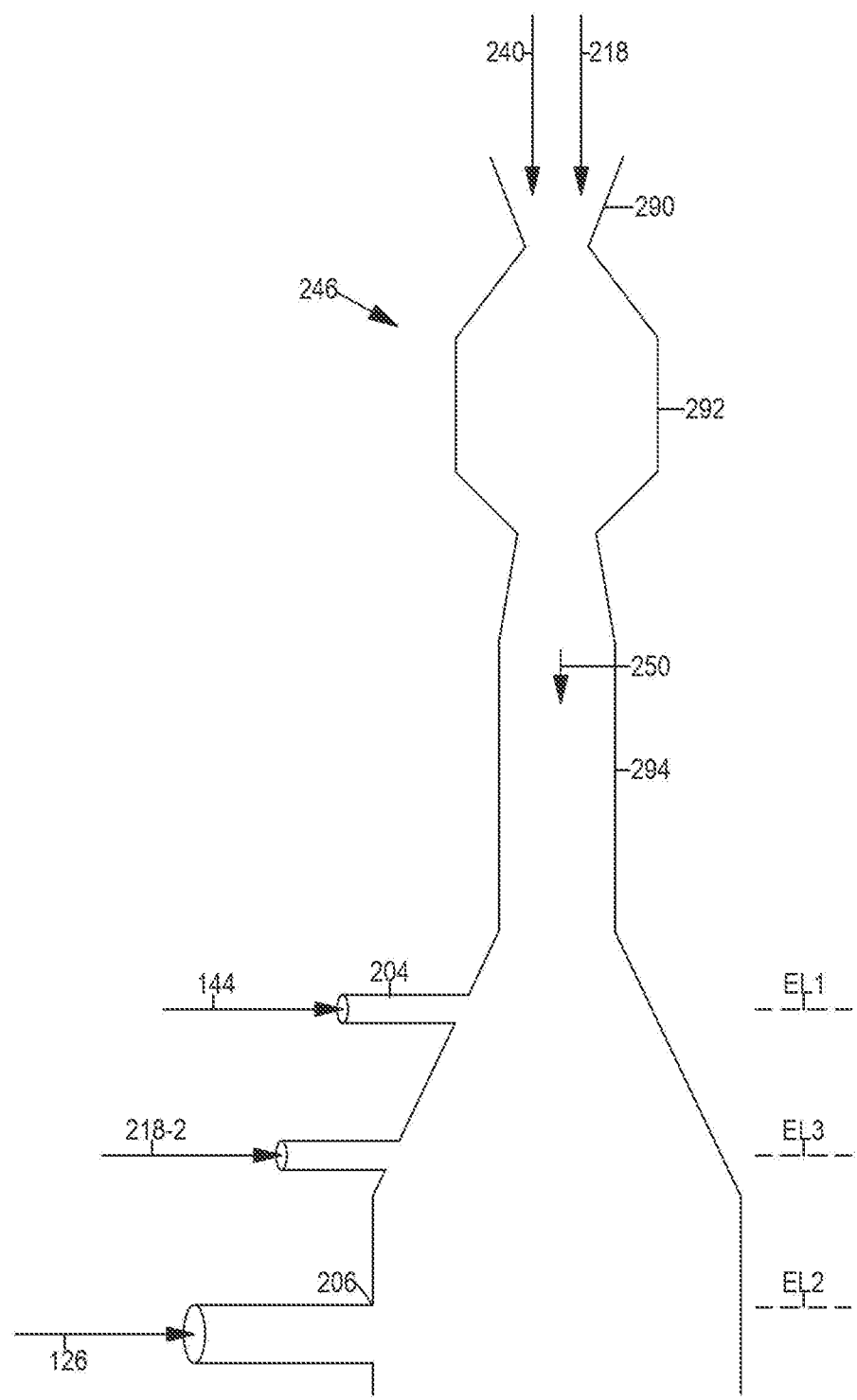
FIG. 7 shows a simplistic representation of a burner (246) connected to the second reactor (200), wherein the burner (246) includes a pulse combustor.
Figure 8:
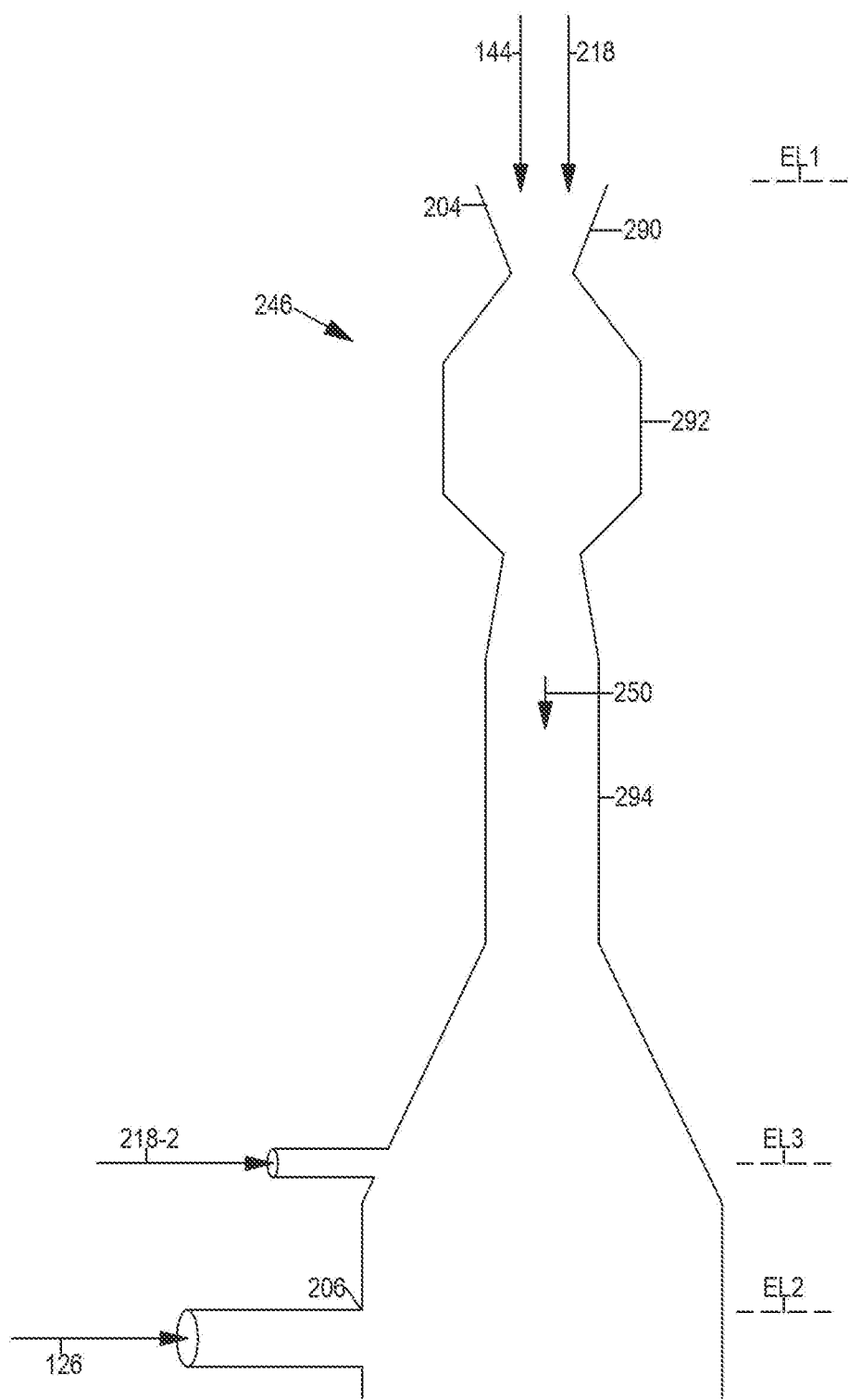
FIG. 8 shows another simplistic representation of a burner (246) connected to the second reactor (200), wherein the burner (246) includes a pulse combustor.

In embodiments, the burner (246) is a Helmholtz pulse combustion resonator (as disclosed in FIGS. 7 and 8). An oxygen-containing gas (218) and a hydrocarbon (240) may be introduced into the burner (246) to produce the combustion stream (250) via a pulse combustion reaction. Thus, the burner (246) may comprise an aerodynamic valve or fluidic diode, combustion chamber and tailpipe or tailpipes. This pulse burner (246) will typically operate in a cyclic fashion comprising the steps of fuel and oxygen-containing gas intake or recharge, compression, ignition and expansion. An ignition or spark source detonates the explosive mixture during start-up. The pulsating flow generated in this burner is characterized by a pressure anti-node in the combustion chamber and a velocity anti-node at the exit of the tailpipe. This results in combustion chamber pressure varying from a low (below mean) to a high (above mean) and this aids in drawing in fuel and oxygen-containing gas during recharge and in pushing out the combustion products through the tailpipe(s) during expansion. The flow exiting the tailpipe is characterized by a high velocity pulsating flow which facilitates good mixing of the exiting oxygen-rich products and the separated char (144) and/or char-depleted product gas (126). Once the first cycle is initiated, operation is thereafter self-sustaining or self-aspirating.

A pulse combustor burner (246) used herein, and as noted above, is based on a Helmholtz configuration with an aerodynamic valve. The pressure fluctuations, which are combustion-induced in the Helmholtz resonator-shaped combustion burner (246), coupled with the fluidic diodicity of the aerodynamic valve burner (246) and nozzle (247), cause a biased flow of the combustion stream (250) from the burner (246), through the nozzle (247) and into the interior (201) of the second reactor (200). This results in the oxygen-containing gas (218) being self-aspirated by the burner (246) and for an average pressure boost to develop in the burner (246) to expel the products of combustion at a high average flow velocity (typically over 300 ft/s) into and through the nozzle (247).

The production of an intense acoustic wave is an inherent characteristic of pulse combustion. Sound intensity in the combustion chamber of burner (246) is normally in the range of 150-190 dB. The operating frequency may range from 40 to 250 Hz and more typically between 50 and 150 Hz.

FIG. 2 shows one non-limiting representation of a burner (246) including a central port (247) and an annular port (245), wherein a second oxygen-containing gas (218) is introduced to the central port (247), and a fuel (240) is introduced to the annular port (245). In embodiments, the fuel (240) introduced to the burner (246) may be tail-gas from a downstream reactor, Fischer Tropsch tail-gas, natural gas, propane, a methane-containing gas, naphtha, conditioned syngas, product gas, off-gas from a downstream reactor, or even landfill gas including a complex mix of different gases created by the action of microorganisms within a landfill. FIGS. 3 to 8 show other non-limiting representations of the burner (246) which is integrated with the second reactor (200).

Figure 2A:
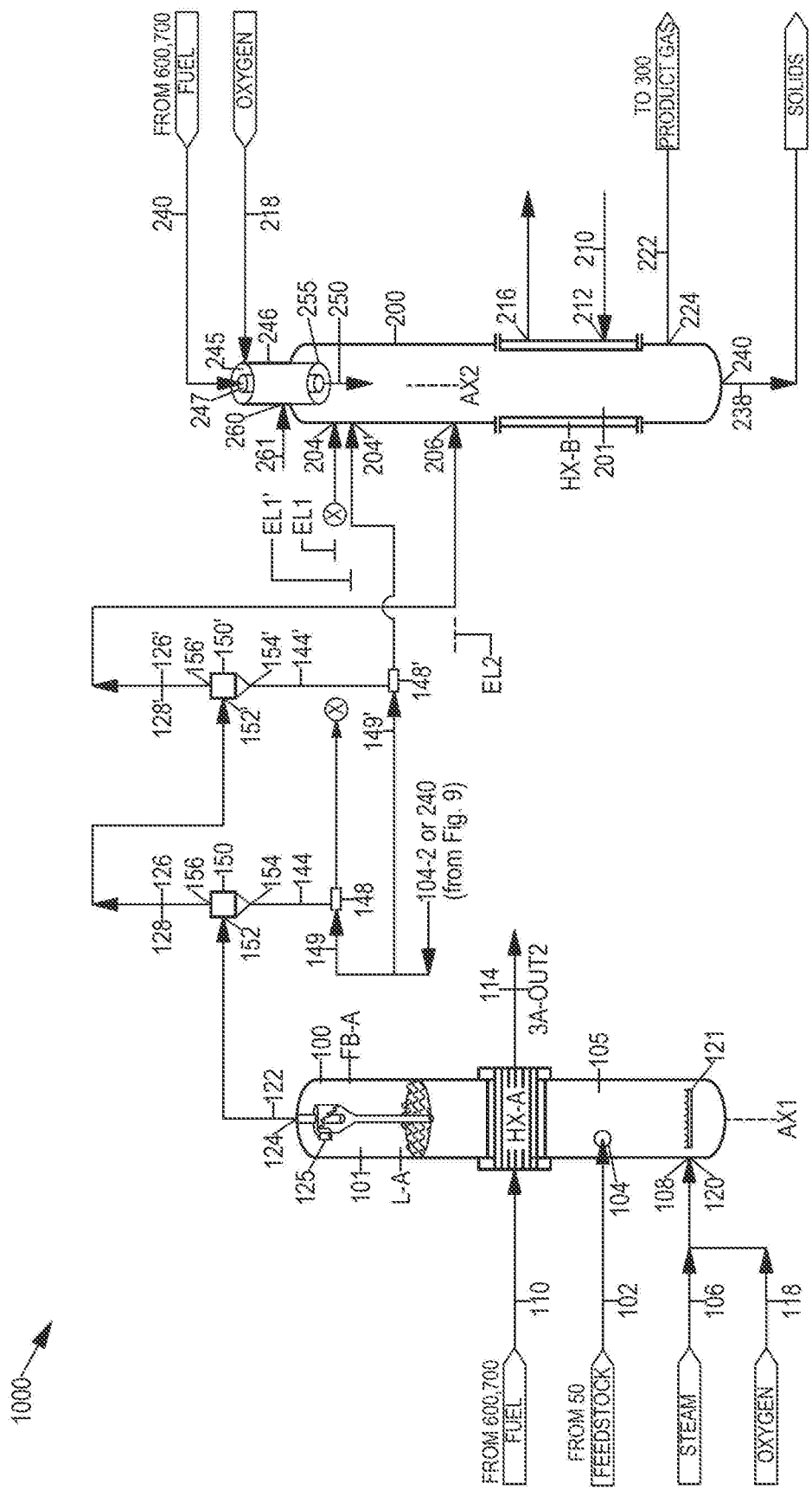
FIG. 2A shows a simplistic diagram of another embodiment of a product gas production system (1000) including: a first reactor (100) configured to produce a first product gas (122) including char, a first solids separation device (150) configured to separate the char from the first product gas (122) to produce separated char (144) and a first char-depleted product gas (126), a second solids separation device (150') configured to separate additional char from the first char-depleted product gas (126) to produce additional separated char (144') and a second char-depleted product gas (126'), and a second reactor (200) configured to separately accept both streams of separated char (144, 144') and the second char-depleted product gas (126'), wherein both streams of separated char (144, 144') are introduced to the second reactor (200) at two first elevations (ELL ELF) and the second char-depleted product gas (126') is also introduced at a second elevation (EL2), wherein both of the first elevations (ELL ELF) are located higher than the second elevation (EL2) along a vertical axis (AX2) of the second reactor (200).

FIG. 2A:

FIG. 2A shows a simplistic diagram of another embodiment of a product gas production system (1000) including: a first reactor (100) configured to produce a first product gas (122) including char, a first solids separation device (150) configured to separate the char from the first product gas (122) to produce separated char (144) and a first char-depleted product gas (126), a second solids separation device (150') configured to separate additional char from the first char-depleted product gas (126) to produce additional separated char (144') and a second char-depleted product gas (126'), and a second reactor (200) configured to separately accept both streams of separated char (144, 144') and the second char-depleted product gas (126'), wherein both streams of separated char (144, 144') are introduced to the second reactor (200) at two first elevations (ELL ELF) and the second char-depleted product gas (126') is also introduced at a second elevation (EL2), wherein both of the first elevations (ELL ELF) are located higher than the second elevation (EL2) along a vertical axis (AX2) of the second reactor (200).

In embodiments, the solids separation device may comprise a plurality of serially connected elements, each configured to separate char from product gas. FIG. 2A shows an embodiment (embodiment 2) in which serially connected cyclones (150, 150') are each shown to remove char (144, 144'). The char (144,144') is then introduced into the second reactor (200) via distinct first and second char inputs (204, 204'), the first char input (204) being at a first char elevation (EL1) which is higher than a second char elevation (EL2) of the second char input (204'). However, both char inputs (204, 204') are at a higher elevation than the product gas input (206). While the embodiment seen in FIG. 2A shows a solid separation device comprising two cyclones), it is understood that more than two cyclones (or other elements) may be serially connected.

In the embodiment of FIG. 2A a first product gas (122) is discharged from the first reactor (100) via the first product gas output (124). The first product gas (122) is introduced to the first solids separation device (150) to produce a first char-depleted product gas (126) and the separated char (144). The first char-depleted product gas (126) is then introduced to the second solids separation device (150') to produce a second char-depleted product gas (126') and additional separated char (144'). The separated char (144) is routed from the char output (154) of the first solids separation device (150) to a first char input (204) of the second reactor (100) at a first elevation (EL1). The additional separated char (144') is routed from the char output (154') of the second solids separation device (150') to a second char input (204') of the second reactor (100) at another first elevation (EL1').

Char (144) is separated from the first product gas (122) in the first solids separation device (150) and is mixed with motive fluid (149) and transported to the first char input (204) of the second reactor (100). The circle with the "X" in the center illustrates a continuous stream transferring the char (144) and the motive fluid (149) to the first char input (204) of the second reactor (100). The additional char (144') is separated from the char-depleted product gas (126) in the second solids separation device (150') and is mixed with a motive fluid (149') and transported to the second char input (204') of the second reactor (100). FIGS. 2 and 2A both show the motive fluid (149, 149') transferred from FIG. 9 as recycled carbon dioxide, however, a gas, nitrogen, tail-gas from a downstream reactor, conditioned syngas, syngas, off-gas from a downstream reactor, steam, superheated steam, a vapor, and a superheated vapor may also be used.

In embodiments, an eductor (148) is used to mix and transport the motive fluid (149) with the separated char (144) to be transferred to the char input (204) of the second reactor (200). In embodiments, the eductor (148) may include a venturi eductor and/or a venturi transport system for dilute phase pneumatic conveying of the char (144) into the second reactor (200) with the motive fluid (148). In embodiments, the eductor (148) includes a Solids Handling Eductors provided by Schutte & Koerting located at 2510 Metropolitan Drive, Trevose, PA 19053 (www.s-k.com). In embodiments, a first eductor (148) is used to mix and transport the motive fluid (149) with the separated char (144) to be transferred to the first char input (204) of the second reactor (200). In embodiments, a second eductor (148') s used to mix and transport the motive fluid (149') with the additional separated char (144') to be transferred to the second char input (204') of the second reactor (200).

Figure 3:
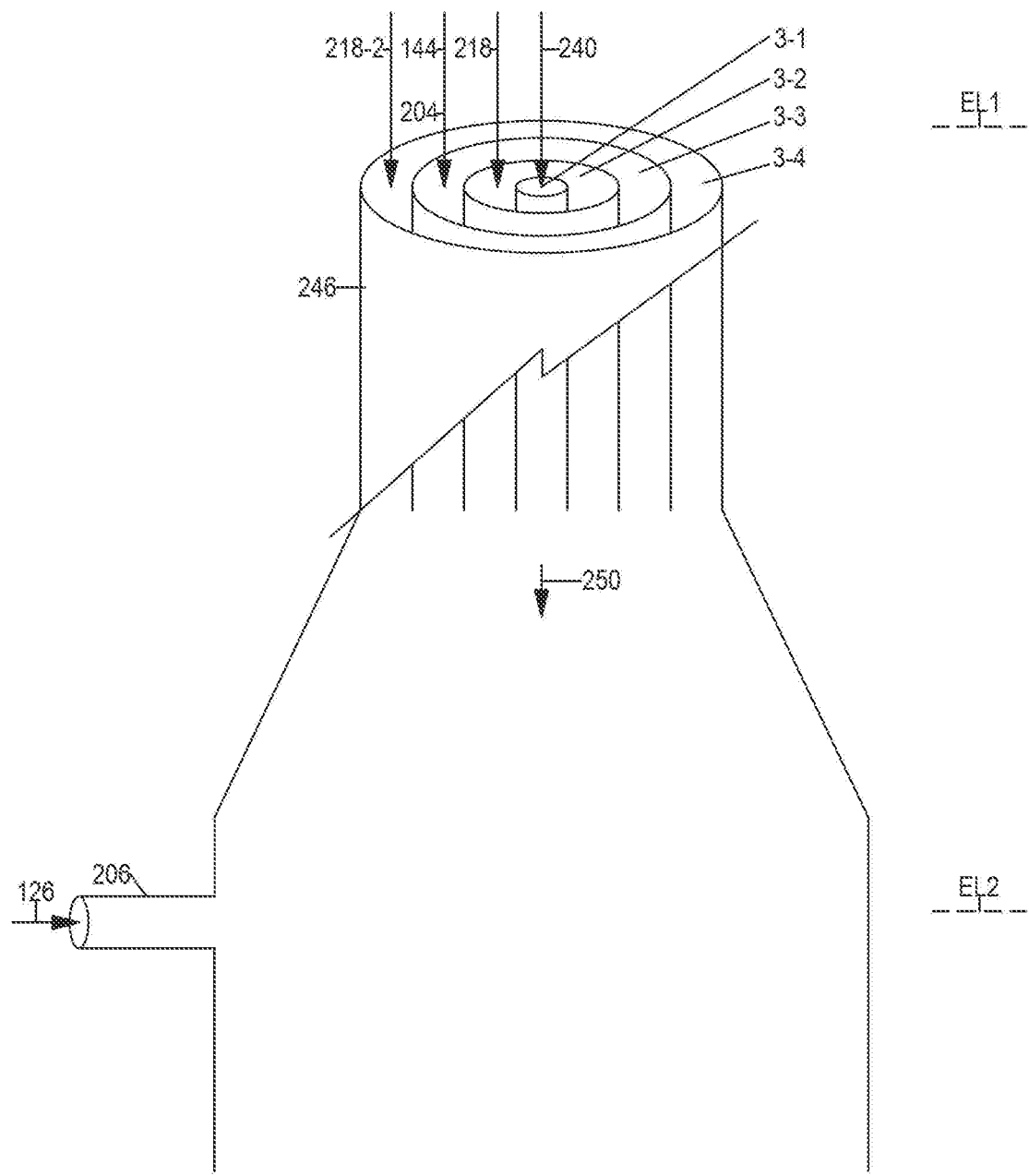
FIG. 3 shows a simplistic representation of a burner (246) connected to the second reactor (200), wherein the burner (246) includes: a central port (3-1), a first annular port (3-2), a second annular port (3-3), and a third annular port (3-4).

FIG. 3:

FIG. 3 shows a simplistic representation of a burner (246) connected to the second reactor (200), wherein the burner (246) includes: a central port (3-1), a first annular port (3-2), a second annular port (3-3), and a third annular port (3-4). In embodiments, the first annular port is closest to the central port (3-1); and the second annular port (3-3) is positioned in between the first annular port (3-2) and the third annular port (3-4).

Fuel (240) is introduced to the central port (3-1), an oxygen containing gas (218) is introduced to the first annular port (3-2), the separated char (144) is introduced to the second annular port (3-3) (via the char input (204) located at a first elevation (EL1)), additional oxygen containing gas (218-2) is introduced to the third annular port (3-4). The separated char (144) introduced to the burner (246) of the second reactor (200) is introduced at a first elevation (EL1), via the char input (204), located along the vertical axis (AX2) of the second reactor (200). The char-depleted product gas (126) is introduced to the interior (201) of the second reactor (200) at a second elevation (EL2), via a product gas input (206), located along the vertical axis (AX2) of the second reactor (200), wherein the second elevation (EL2) is located below the first elevation (EL1).

Figure 4:
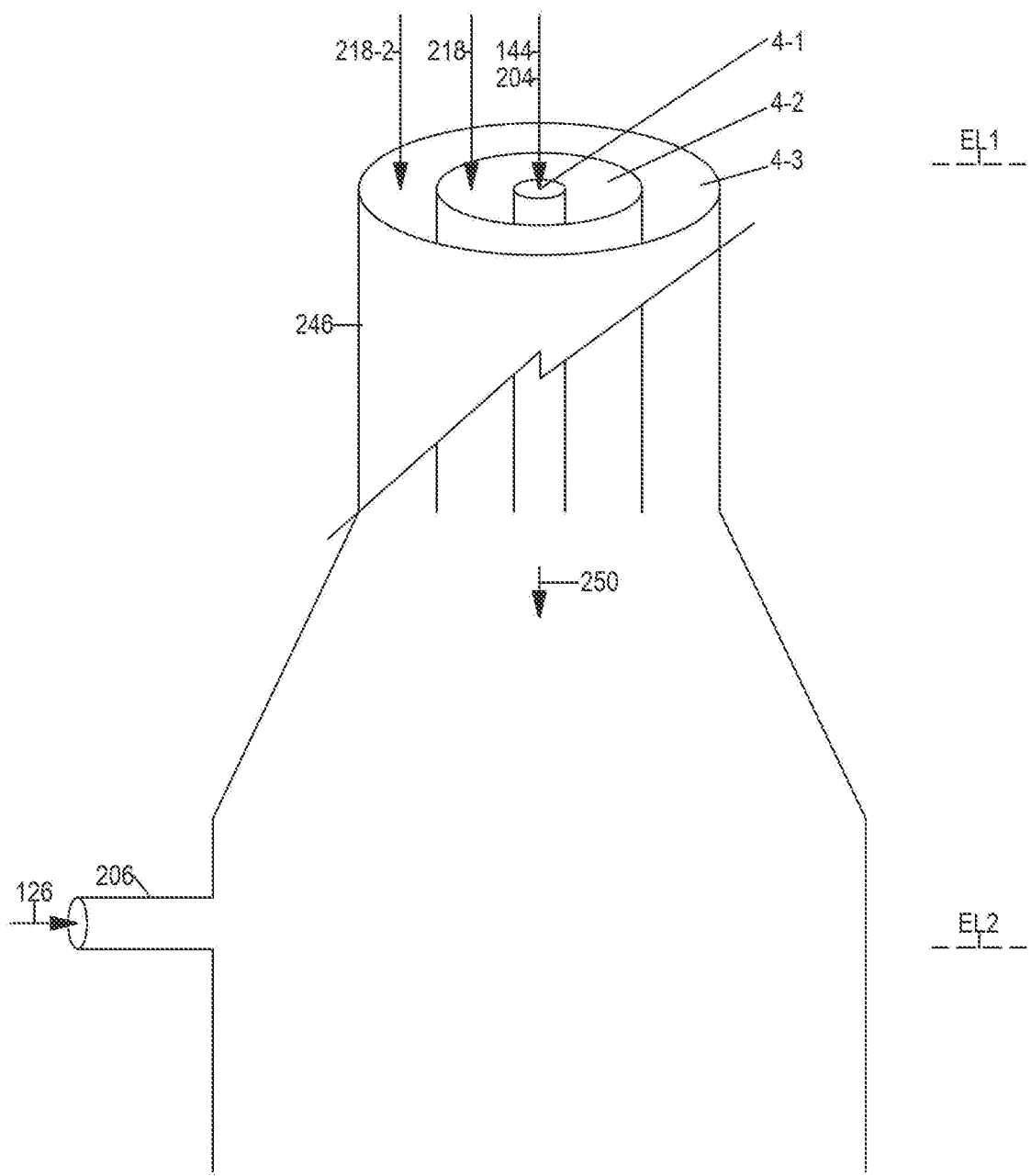
FIG. 4 shows a simplistic representation of a burner (246) connected to the second reactor (200), wherein the burner (246) includes: a central port (4-1), a first annular port (4-2), and a second annular port (4-3).

FIG. 4:

FIG. 4 shows a simplistic representation of a burner (246) connected to the second reactor (200), wherein the burner (246) includes: a central port (4-1), a first annular port (4-2), and a second annular port (4-3). FIG. 4 shows a simplistic representation of a burner (246) connected to the second reactor (200), wherein the burner (246) includes: a central port (4-1), a first annular port (4-2), and a second annular port (4-3); wherein the first annular port is closest to the central port (4-1).

The separated char (144) is introduced to the central port (4-1), an oxygen containing gas (218) is introduced to the first annular port (4-2), and additional oxygen containing gas (218-2) is introduced to the second annular port (4-3). The separated char (144) introduced to the burner (246) of the second reactor (200) is introduced via the char input (204), at a first elevation (EL1) located along the vertical axis (AX2) of the second reactor (200). The char-depleted product gas (126) is introduced to the interior (201) of the second reactor (200) via the product gas input (206) located at a second elevation (EL2) located along the vertical axis (AX2) of the second reactor (200), wherein the second elevation (EL2) is located below the first elevation (EL1).

Figure 5:
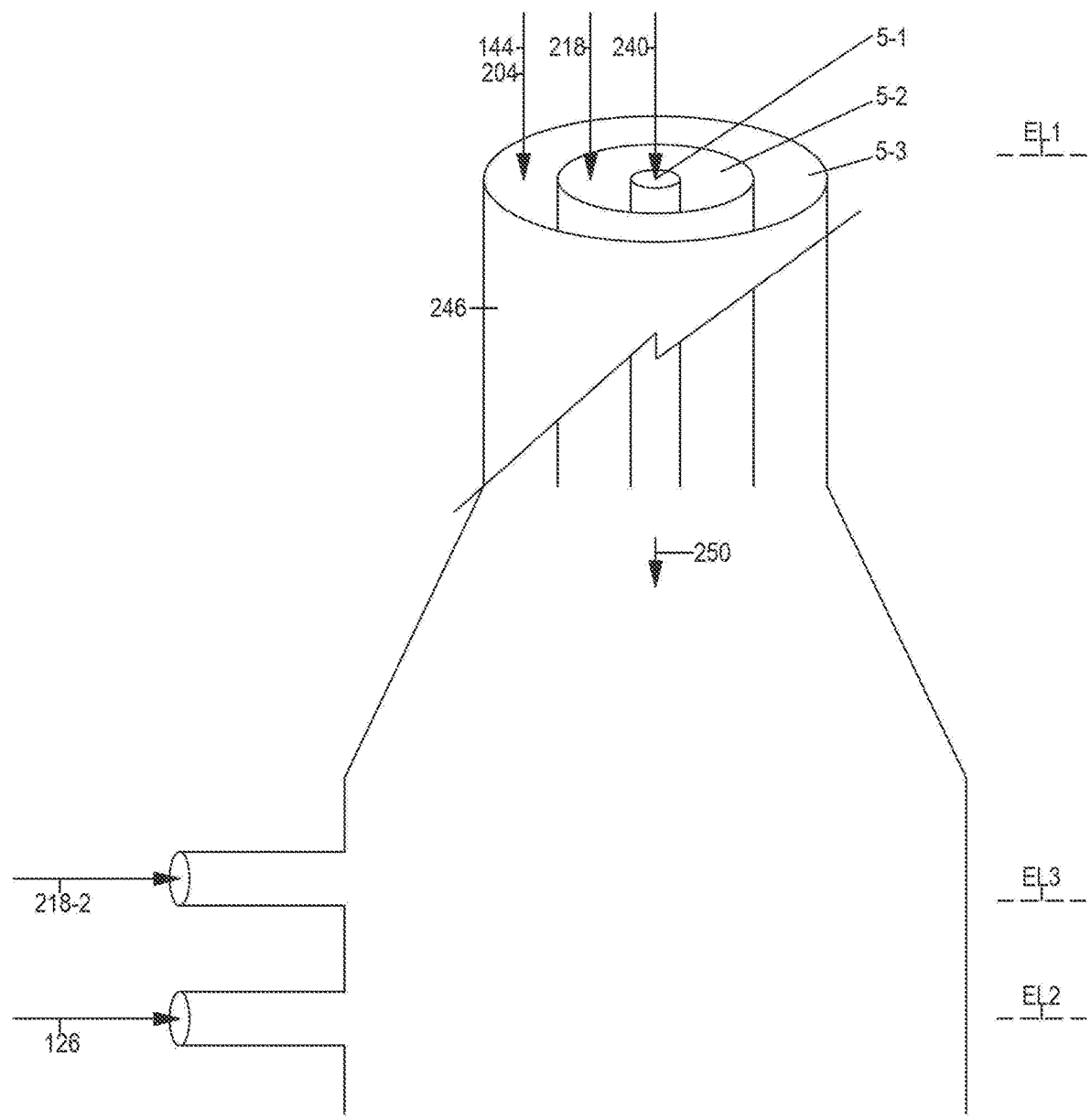
FIG. 5 shows a simplistic representation of a burner (246) connected to the second reactor (200), wherein the burner (246) includes: a central port (5-1), a first annular port (5-2), and a second annular port (5-3).

FIG. 5:

FIG. 5 shows a simplistic representation of a burner (246) connected to the second reactor (200), wherein the burner (246) includes: a central port (5-1), a first annular port (5-2), and a second annular port (5-3). FIG. 5 shows a simplistic representation of a burner (246) connected to the second reactor (200), wherein the burner (246) includes: a central port (5-1), a first annular port (5-2), and a second annular port (5-3); wherein the first annular port is closest to the central port (5-1). Fuel (240) is introduced to the central port (5-1), an oxygen containing gas (218) is introduced to the first annular port (5-2), the separated char (144) is introduced to the second annular port (5-3).

The separated char (144) introduced to the burner (246) of the second reactor (200) is introduced via the char input (204) at a first elevation (EL1) located along the vertical axis (AX2) of the second reactor (200). The char-depleted product gas (126) is introduced to the interior (201) of the second reactor (200) via the product gas input (206) at a second elevation (EL2) located along the vertical axis (AX2) of the second reactor (200), wherein the second elevation (EL2) is located below the first elevation (EL1). In embodiments, an additional oxygen-containing gas (218-2) may either be introduced coaxially to the char-depleted product gas (126) or separately at a third elevation (EL3) in between the first elevation (EL1) and the second elevation (EL2). In embodiments, the additional oxygen-containing gas (218-2) is introduced into the second reactor (200) to promote partial oxidation of the char-depleted product gas.

Figure 6:
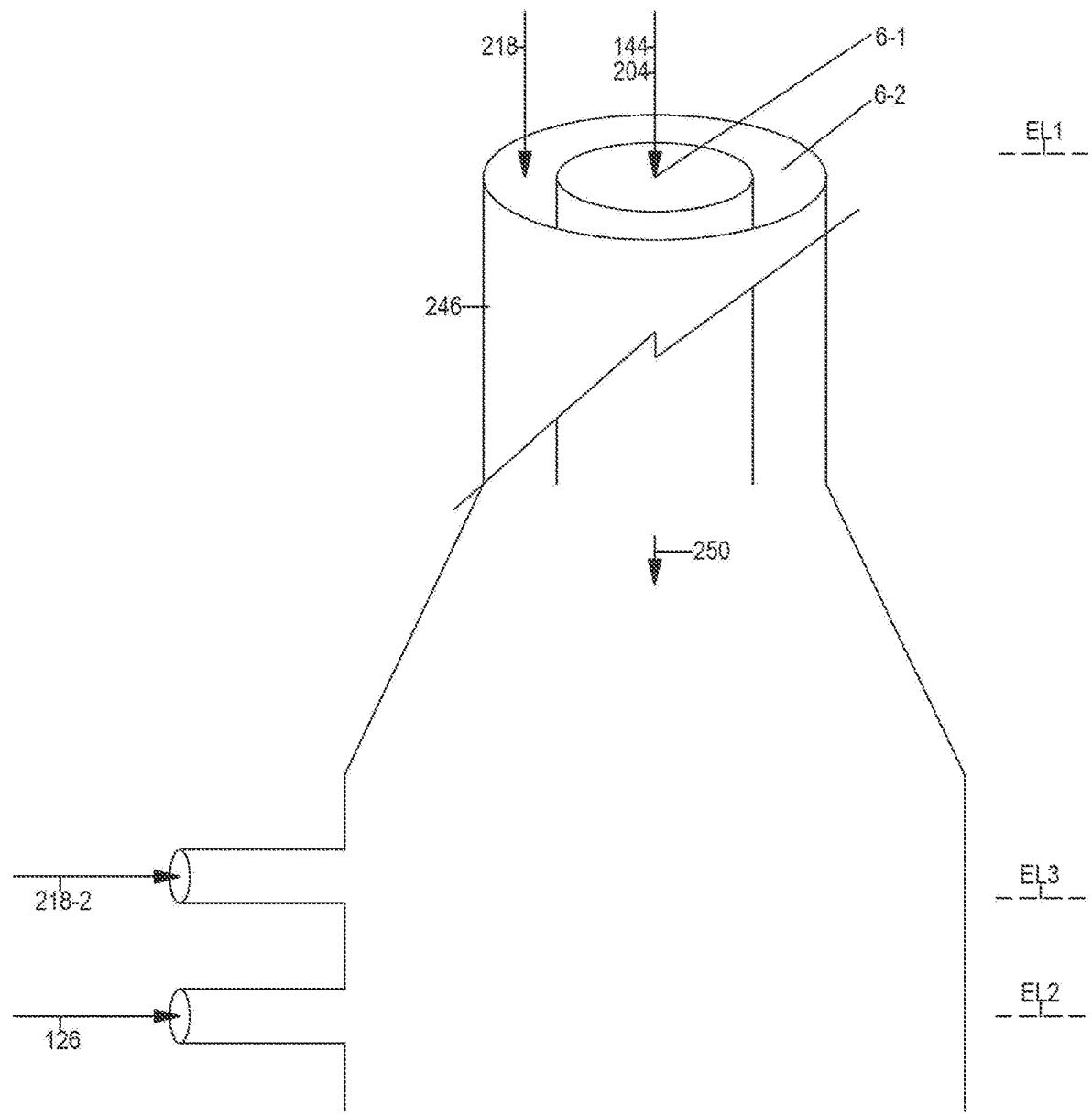
FIG. 6 shows a simplistic representation of a burner (246) connected to the second reactor (200), wherein the burner (246) includes: a central port (6-1) and a first annular port (6-2).

FIG. 6:

FIG. 6 shows a simplistic representation of a burner (246) connected to the second reactor (200), wherein the burner (246) includes: a central port (6-1) and a first annular port (6-2). The separated char (144) is introduced to the central port (6-1) and an oxygen containing gas (218) is introduced to the first annular port (6-2).

The separated char (144) introduced to the burner (246) of the second reactor (200) is introduced via the char input (204) at a first elevation (EL1) located along the vertical axis (AX2) of the second reactor (200). The char-depleted product gas (126) is introduced to the interior (201) of the second reactor (200) at a second elevation (EL2) located along the vertical axis (AX2) of the second reactor (200), via the product gas input (206) wherein the second elevation (EL2) is located below the first elevation (EL1).

In embodiments, an additional oxygen-containing gas (218-2) may either be introduced coaxially to the char-depleted product gas (126) or separately at a third elevation (EL3) in between the first elevation (EL1) and the second elevation (EL2). In embodiments, the additional oxygen-containing gas (218-2) is introduced into the second reactor (200) to promote partial oxidation of the char-depleted product gas.

FIG. 7:

FIG. 7 shows a simplistic representation of a burner (246) connected to the second reactor (200), wherein the burner (246) includes a pulse combustor. FIG. 7 shows the burner (246) as a pulse combustor. The pulse combustion burner (246) includes: an inlet section (290), a combustion section (292), and a resonance section (294). FIG. 7 shows the inlet section (290) configured to accept both an oxygen-containing gas (218) and a fuel (240). The oxygen-containing gas (218) and a fuel (240) are mixed and then combusted in the combustion section (292) to produce a combustion stream (250).

The separated char (144) is introduced to the interior (201) of the second reactor (200) via a char input (204) located at a first elevation (EL1) located along the vertical axis (AX2) of the second reactor (200). The separated char (144) introduced at the first elevation (EL1) first reacts with the combustion stream (250) which contains oxygen to substantially convert the separated char (144) into carbon monoxide and carbon dioxide.

The char-depleted product gas (126) is introduced to the interior (201) of the second reactor (200) via the product gas input (206) located at the second elevation (EL2), lower than the first elevation (EL2), then reacts with the products of the separated char (144) and combustion stream (250) to substantially convert the low molecular weight hydrocarbons, volatile organic compounds, semi-volatile organic compounds within the char-depleted product gas (126) into carbon monoxide and hydrogen. In embodiments, an additional oxygen-containing gas (218-2) may either be introduced coaxially to the char-depleted product gas (126) or separately at a third elevation (EL3) in between the first elevation (EL1) and the second elevation (EL2) to achieve and maintain the desired operating temperature and conversion. In embodiments, the additional oxygen-containing gas (218-2) is introduced into the second reactor (200) to promote partial oxidation of the char-depleted product gas.

FIG. 8:

FIG. 8 shows another simplistic representation of a burner (246) connected to the second reactor (200), wherein the burner (246) includes a pulse combustor. FIG. 8 shows the burner (246) as a pulse combustor. The pulse combustion burner (246) includes: an inlet section (290), a combustion section (292), and a resonance section (294). FIG. 8 shows the inlet section (290) configured to accept both an oxygen-containing gas (218) and separated char (144), wherein the separated char (144) is introduced to the burner (246) at a first elevation (EL1) located along the vertical axis (AX2) of the second reactor (200). The oxygen-containing gas (218) and the separated char (144) are mixed and then combusted in the combustion section (292) to produce a combustion stream (250).

The separated char (144) introduced via the char input (204) located at the first elevation (EL1) first reacts with the oxygen-containing gas (218) to form the combustion stream (250). The char-depleted product gas (126) introduced via the product gas input (206) located at the second elevation (EL2), lower than the first elevation (EL2), then reacts with the combustion stream (250) to substantially convert the low molecular weight hydrocarbons, volatile organic compounds, semi-volatile organic compounds within the char-depleted product gas (126) into carbon monoxide and hydrogen. In embodiments, an additional oxygen-containing gas (218-2) may either be introduced coaxially to the char-depleted product gas (126) or separately at a third elevation (EL3) in between the first elevation (EL1) and the second elevation (EL2) to achieve and maintain the desired operating temperature and conversion.

FIG. 9:

FIG. 9 shows a simplistic diagram of one embodiment of Integrated Biorefinery (IBR) including the product gas production system (1000) as disclosed in FIGS. 1, 2, and 2A. In embodiments, the product gas production system (1000) as disclosed in FIGS. 1, 2, and 2A is included within an Integrated Biorefinery (IBR) for the conversion of a carbonaceous material (102) into a useful product (1500).

In embodiments, the Integrated Biorefinery (IBR) includes a feedstock preparation system (25), a feedstock delivery system (50), the product gas generation system (1000), a primary gas clean-up system (300), a compression system (400), a secondary gas clean-up system (500), a production system (600), and a purification system (700).

In embodiments, the feedstock preparation system (25) is configured to accept a carbonaceous material via an input (25-1) and discharge a carbonaceous material via an output (25-2). In embodiments, the feedstock preparation system (25) processes the carbonaceous material in at least one processing step, including one or more processing steps selected from the group consisting of large objects removal, recyclables removal, ferrous metal removal, size reduction, drying or water removal, biowaste removal, non-ferrous metal removal, polyvinyl chloride removal, glass removal, size reduction, and pathogen removal.

In embodiments, the feedstock delivery system (50) is configured to accept, via an input (50-1), a carbonaceous material from the output (25-2) of the feedstock preparation system (25) and transfer the carbonaceous material to the input (104) of the first reactor (100) within the product gas production system (1000). In embodiments, the feedstock delivery system (50) is configured to transfer the carbonaceous material to interior of the pressurized first reactor and to form a seal between a pressurized interior (101) of the first reactor (100) and the input (50-1) of the feedstock delivery system (50). In embodiments, the feedstock delivery system (50) includes a plug feeder system configured to create plugs from the carbonaceous material, wherein the plugs are used to form a seal between a pressurized interior (101) of the first reactor (100). In embodiments, the feedstock delivery system (50) includes a densification system configured to create densify the carbonaceous material and form densified carbonaceous material, wherein the densified carbonaceous material is used to form a seal between a pressurized interior (101) of the first reactor (100). In embodiments, the feedstock delivery system (50) includes a screw auger configured to transport the carbonaceous material to the interior (101) of the first reactor (100). In embodiments, the feedstock delivery system (50) includes a solids transport conduit configured to transport solid carbonaceous material to the interior (101) of the first reactor (100). In embodiments, the feedstock delivery system (50) includes a lock-hopper configured to transport the carbonaceous material to the interior (101) of the first reactor (100). The carbonaceous material is discharged from the output (50-2) of the feedstock delivery system (50) and into the interior (101) of the first reactor (100) via an input (104).

In embodiments, the feedstock delivery system (50) is also configured to accept a recycle gas (104-0), such as carbon dioxide, discharged from a recycled gas output (500-3) of a downstream secondary gas clean-up system (500). In embodiments, the recycle gas (104-0) includes carbon dioxide and is removed from product gas in a downstream secondary gas clean-up system (500).

As disclosed in FIG. 9 (and in FIGS. 1 and 2), the product gas production system (1000) includes a first reactor (100), a solids separation device (150), and a second reactor (200). The first reactor (100) generates a first product gas (122) by reacting a source of carbonaceous material (102) with a reactant (106), such as superheated steam, in a steam reforming reaction, wherein the first product gas (122) includes syngas comprising hydrogen, carbon monoxide, carbon dioxide, low molecular weight hydrocarbons, volatile organic compounds, semi-volatile organic compounds, and char. The first product gas (122) is discharged from the first reactor (100) via a first product gas output (124) and is routed towards a solids separation device (150) which separates the char (144) from the first product gas (122) to produce separated char (144) and char-depleted product gas (126). The char-depleted product gas (126) has a reduced amount of char (144) within it relative to the first product gas (122).

In embodiments, the first reactor (100) is also configured to accept a recycle gas (104-1), such as carbon dioxide, discharged from a recycled gas output (500-3) of a downstream secondary gas clean-up system (500). In embodiments, the recycle gas (104-1) may be used for instrumentation purges for level and/or density measurement devices.

The solids separation device (150) accepts the first product gas (122) via a first separation input (152). The solids separation device (150) accepts the first product gas (122) from the first product gas output (124) of the first reactor (100). The char-depleted product gas (126) is discharged from the solids separation device (150) via the first separation gas output (156). The separated char (144) is discharged from the solids separation device (150) via the first separation char output (154).

The second reactor (200) is configured to accept both the separated char (144) and the char-depleted product gas (126) discharged from the solids separation device (150). The separated char (144) is introduced to the interior (201) of the second reactor (200) via a char input (204). The char-depleted product gas (126) is introduced to the interior (201) of the second reactor (200) via a product gas input (206).

In embodiments, the second reactor (200) is also configured to accept a recycle gas (104-2), such as carbon dioxide, discharged from a recycled gas output (500-3) of a downstream secondary gas clean-up system (500). In embodiments, the recycle gas (104-2) may be used for instrumentation purges for level and/or density measurement devices, and also may be used to a motive fluid (149) which can be mixed with the separated char (144) for transporting the separated char (144) to the char input (204) of the second reactor (200) (as seen in FIGS. 2 and 2A).

The separated char (144) and the char-depleted product gas (126) are both reacted within the interior (201) of the second reactor (200) to produce a second reactor product gas (222). The second reactor product gas (222) is discharged from the second reactor (200) via a second product gas output (224).

In embodiments, the primary gas clean-up system (300) is configured to accept, via an input (300-1), the second reactor product gas (222) discharged from the second reactor (200) via a second product gas output (224). In embodiments, the primary gas clean-up system (300) is configured cool and remove solids and water vapor from the second reactor product gas (222) and produce a first cleaned product gas which is discharged via an output (300-2).

In embodiments, the compression system (400) is configured to accept, via an input (400-1), the first cleaned product gas via the output (300-2) of the primary gas clean-up system (300) and compress the first cleaned product gas to produce a compressed product gas. The compressed product gas is discharged from an output (400-2) of the compression system (400) and is routed to the input (500-1) of the secondary gas clean-up system (500). The compression system (400) is configured to increase a pressure of the first cleaned product and discharge the compressed product gas via the output (400-2) at a second pressure greater than a first pressure at which the first cleaned product gas entered via the compression system input (400-1).

In embodiments, the secondary gas clean-up system (500) is configured to accept the compressed product gas from the output (400-2) of the compression system (400) and produce a second cleaned product gas that is discharged from an output (500-2) of the secondary gas clean-up system (500). In embodiments, the secondary gas clean-up system (500) is configured to remove carbon dioxide from at least a portion of the compressed product gas discharged from the compression system (400) with a carbon dioxide removal system to produce from a recycled gas output (500-3) which may then be used as a recycle gas, or a carbon dioxide-rich stream, in the feedstock delivery system (50) (as recycle gas (104-0)), the first reactor (100) (as recycle gas (104-1)), or to be mixed with the separated char (144) transferred to the second reactor (200) (as the recycle gas (104-2) which may be used as the motive fluid (149) for transferring the separated char (144) from the solids separation device (150) to the char input (204) of the second reactor (200) as seen in FIGS. 2 and 2A).

In embodiments, the secondary gas clean-up system (500) removes carbon dioxide from the compressed product gas using a carbon dioxide removal system. In embodiments, the carbon dioxide removal system within the secondary gas clean-up system (500) includes one or more systems selected from the group consisting of a membrane, solvent-based scrubbing systems using amines or physical solvents (i.e., Rectisol, Selexol, Sulfinol), a wet limestone scrubbing system, a spray dry scrubber, a claus processing system, a solvent based sulfur removal processes such as the UC Sulfur Recovery Process (UCSRP), a high temperature sorbent, glycol ether, diethylene glycol methyl ether (DGM), a regenerable sorbent, a non-regenerable sorbent, molecular sieve zeolites, calcium based sorbents, FeO, MgO or ZnO-based sorbents or catalysts, iron sponge, potassium-hydroxide-impregnated activated-carbon systems, impregnated activated alumina, titanium dioxide catalysts, vanadium pentoxide catalysts, tungsten trioxide catalysts, sulfur bacteria (Thiobacilli), sodium biphospahte solutions, aqueous ferric iron chelate solutions, potassium carbonate solutions, alkali earth metal chlorides, magnesium chloride, barium chloride, crystallization systems, bio-catalyzed scrubbing processes such as the THIOPAQ Scrubber, and hydrodesulphurization catalysts.

In embodiments, the secondary gas clean-up system (500) is also configured to remove contaminants from product gas, wherein the contaminants include ammonia (which can be removed via absorption and/or adsorption), VOCs (which can be removed via adsorption), sulfur (which can be removed via absorption and/or adsorption), carbonyl sulfide (which can be removed via hydrolysis), metals (which can be removed via absorption and/or adsorption), hydrogen purification (purified with adsorption and/or a membrane).

In embodiments, the production system (600) is configured to accept, via an input (600-1), and produce an intermediate product from at least a portion of the second cleaned product gas discharged from the output (500-2) of the secondary gas clean-up system (500). In embodiments, the production system (600) produces and discharges an intermediate product via an output (600-2) which is routed to the input (700-1) of a purification system (700). In embodiments, the production system (600) also produces and discharges a gaseous composition, or a tail-gas, via a recycle output (600-3) which is routed to the first reactor heat exchanger (HX-1) (as seen in FIGS. 2 and 2A), or to the burner (246) as shown in FIGS. 2 to 9 for use as the source of fuel (240). In embodiments, the production system (600) produces and discharges a gaseous composition, or the tail-gas, via a recycle output (600-3) which may be used as the motive fluid (149) and mixed with the separated char (144) to be transferred to the char input (204) of the second reactor (200).

In embodiments, the intermediate product produced in the production system (600) includes one or more systems selected from the group consisting of ethanol, mixed alcohols, methanol, dimethyl ether, chemicals or chemical intermediates (plastics, solvents, adhesives, fatty acids, acetic acid, carbon black, olefins, oxochemicals, ammonia, etc.), Fischer-Tropsch products (LPG, Naphtha, Kerosene/diesel, lubricants, waxes), synthetic natural gas. In embodiments, the production system (600) includes one or more production systems selected from the group consisting of a reactor, a methanation reactor, a multi tubular reactor, a multi tubular fixed-bed reactor, an entrained flow reactor, a slurry reactor, a fluid-bed reactor, a circulating catalyst reactor, a riser reactor, a can reactor, a microchannel reactor, a fixed bed reactor, a bioreactor, and a moving bed reactor.

In embodiments, the production system (600) includes a cobalt catalyst and/or an iron catalyst. In embodiments, the production system (600) includes a methanation reactor to produce synthetic natural gas from the second cleaned product gas. In embodiments, the production system (600) includes a catalyst and can produce liquid fuels such as mixed alcohols (e.g., a mixture of both ethanol and methanol), dimethyl ether, Fischer-Tropsch products, or the like. In embodiments, the production system (600) includes a bioreactor containing microorganisms. The microorganisms produce a liquid fuel (e.g., ethanol, 1-butanol, 2-butanol) and/or chemicals within the bioreactor.

In embodiments, the intermediate product includes a liquid fuel and/or a chemical that is produced in a bioreactor is then distilled in the purification system (700). In embodiments, the liquid fuel and/or a chemical produced in the bioreactor is then removed using a membrane. In embodiments, the liquid fuel and/or a chemical produced in the bioreactor is then dehydrated using pressure swing adsorption. In embodiments, the liquid fuel and/or a chemical produced in the bioreactor is then dehydrated using an adsorbent. In embodiments, the liquid fuel and/or a chemical produced in the bioreactor is then dehydrated using 3 angstrom molecular sieves.

In embodiments, the intermediate product includes a chemical produced in the bioreactor includes one or more selected from the group consisting of: 3-hydroxypropionate; mevalonate; mevalonic acid; isoprene; aromatics; benzoate (p-hydroxyl, 2-amino, dihydroxy); salicylate; 1-propanol; 1,2-propanediol; (R)-1,2-propanediol; (S)-1,2-propanediol; mixed isomers of 1,2-propanediol; acetoin; methyl ethyl ketone; branched-chain amino acids; valine, leucine, isoleucine; succinate; lactate; 2,3-butanediol; (R,R)-2,3-butanediol; me so-2,3-butane diol; mixed isomers of 2,3-butanediol; citramalate; 1,3-butanediol; (R)-1,3-butanediol; (S)-1,3-butanediol; mixed isomers of 1,3-butanediol; 3-hydroxybutyrate; (R)-3-hydroxybutyrate; (S)-3-hydroxybutyrate; mixed isomers of 3-hydroxybutyrate; butyrate; acetone; isopropanol; acetate; 1,3-butadiene; biopolymers; isobutene; long chain alcohols.

In embodiments, when ethanol is produced in the bioreactor of the production system (600), it is then distilled in the purification system (700). In embodiments, the ethanol produced in the bioreactor is then removed using a membrane. In embodiments, the ethanol produced in the bioreactor is then dehydrated using pressure swing adsorption. In embodiments, the ethanol produced in the bioreactor is then dehydrated using an adsorbent. In embodiments, the ethanol produced in the bioreactor is then dehydrated using 3 angstrom molecular sieves.

In embodiments, the bioreactor includes one or more type of bioreactors selected from the group consisting of a continuous stirred tank bioreactor, a bubble column bioreactor, a microbubble reactor, an airlift bioreactor, a fluidized bed bioreactor, a packed bed bioreactor, and a photo-bioreactor. In embodiments, the microorganisms used within the bioreactor include genetically modified organisms. In embodiments, the microorganisms used within the bioreactor do not include genetically modified organisms. In embodiments, the microorganisms used within the bioreactor include gas fermenting organisms. In embodiments, the microorganisms used within the bioreactor undergo anaerobic respiration. In embodiments, the microorganisms used within the bioreactor undergo fermentation. In embodiments, the microorganisms used within the bioreactor include anaerobic bacteria. In embodiments, the bioreactor includes a liquid nutrient medium used for culturing the microorganisms and the ethanol is produced within the bioreactor by the microorganisms which secrete ethanol which accumulates within the liquid nutrient medium.

In embodiments, the purification system (700) is configured to accept the intermediate product produced and discharged from the production system (600) via the output (600-2). A purified product (1500) is discharged from an output (700-2) of the purification system (700). In embodiments, the purification system (700) produces and discharges a gaseous composition, or off-gas stream, via a recycle output (700-3) which is routed to the first reactor heat exchanger (HX-1) (as seen in FIGS. 2 and 2A), or to the burner (246) as shown in FIGS. 2 to 9 for use as the source of fuel (240). In embodiments, the purification system (700) upgrades the intermediate product. In embodiments, the purification system (700) produces and discharges a gaseous composition, or the off-gas stream, via a recycle output (700-3) which may be used as the motive fluid (149) and mixed with the separated char (144) to be transferred to the char input (204) of the second reactor (200). In embodiments, if isomerization, hydrotreating, hydrocracking, distillation, and adsorption are used, the off-gas includes hydrogen or hydrocarbons. In embodiments, if synthetic natural gas is produced and adsorption is used the off-gas includes hydrogen or hydrocarbons.

In embodiments, the purification system (700) hydrotreats the intermediate product produced and discharged from the production system (600). In embodiments, the purification system (700) hydrocracks the intermediate product produced and discharged from the production system (600). In embodiments, the purification system (700) distills the intermediate product produced and discharged from the production system (600). In embodiments, the purification system (700) adsorbs impurities from the intermediate product produced and discharged from the production system (600). In embodiments, the purification system (700) accepts the intermediate product from the output (600-2) of the production system (600) and purifies with one or more processing steps selected from the group consisting of isomerization, hydrotreating, hydrocracking, distillation, and adsorption.

It will be appreciated that the foregoing examples, given for purposes of illustration, are not to be construed as limiting the scope of this disclosure. Although only a few exemplary embodiments of this disclosure have been described in detail above, those skilled in the art will readily appreciate that many variation of the theme are possible in the exemplary embodiments without materially departing from the novel teachings and advantages of this disclosure. Accordingly, all such modifications are intended to be included within the scope of this disclosure that is defined in the following claims and all equivalents thereto. Further, it is recognized that many embodiments may be conceived in the design of a given system that do not achieve all of the advantages of some embodiments, yet the absence of a particular advantage shall not be construed to necessarily mean that such an embodiment is outside the scope of the present disclosure.

Thus, specific systems and methods of a two-stage syngas production system integrated within an Integrated Biorefinery (IBR) have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although the foregoing text sets forth a detailed description of numerous different embodiments of the disclosure, it should be understood that the scope of the disclosure is defined by the words of the claims set forth at the end of this patent. The detailed description is to be construed as exemplary only and does not describe every possible embodiment of the disclosure because describing every possible embodiment would be impractical, if not impossible. Numerous alternative embodiments could be implemented, using either current technology or technology developed after the filing date of this patent, which would still fall within the scope of the claims defining the disclosure.

Thus, many modifications and variations may be made in the techniques and structures described and illustrated herein without departing from the spirit and scope of the present disclosure. Accordingly, it should be understood that the methods and apparatus described herein are illustrative only and are not limiting upon the scope of the disclosure.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or embodiments of the disclosure disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

LISTING OR REFERENCE NUMERALS product gas production system (1000)
first reactor (100)
interior (101)
first vertical axis (AX1)
carbonaceous material (102)
input (104)
particulate heat transfer material (105)
reactant (106)
reactant input (108)
first fuel (110)
combustion stream (114)
first oxygen-containing gas (118)
first oxygen-containing gas input (120)
first product gas (122)
first product gas output (124)
internal cyclone (125)
char-depleted product gas (126, 126')
char depleted product gas conduit (128, 128')
separated char (144, 144')
eductor (148, 148')
gas (149, 149')
solids separation device (150, 150')
first separation input (152, 152')
first separation char output (154, 154')
first separation gas output (156, 156')
fluid bed level (L-1)
fluidization distributor (121)
freeboard (FB-1)
first reactor heat exchanger (HX-1)
first elevation (EL1)
second elevation (EL2)
second reactor (200)
interior (201)
second vertical axis (AX2)
char input (204, 204')
product gas input (206)
oxygen-containing gas (218)
second oxygen-containing gas input (220)
second product gas output (224)
second reactor product gas (222)
fuel (322)
burner (346)
central port (347)
annular port (345)
burner nozzle (355)
second reactor heat exchanger (HX-2)
heat transfer medium outlet (216)
heat transfer medium inlet (212)
heat transfer medium (210)
solids (338)
solids output (340)
combustion stream (350)
inlet section (405)
combustion section (410)
tail pipe section (415)
third elevation (EL3)
feedstock preparation system (25)
input (25-1)
output (25-2)
feedstock delivery system (50)
input (50-1)
output (50-2)
recycle gas (104-0)
recycle gas (104-1)
recycle gas (104-2)

primary gas clean-up system (300)
input (300-1)
output (300-2)
compression system (400)
input (400-1)
output (400-2)
secondary gas clean-up system (500)
input (500-1)
output (500-2)
recycled gas output (500-3)
production system (600)
input (600-1)
output (600-2)
recycle-gas (600-3)
purification system (700)
input (700-1)
output (700-2)
recycle-gas (700-3)

What is claimed is:

1. A system comprising:
a first reactor configured to generate a first product gas including char;
a solids separation device configured to separate the char from the first product gas to produce separated char and char-depleted product gas, wherein the char-depleted product gas has a reduced amount of char relative to the first product gas;
an eductor configured to accept a recycle gas and configured to entrain the separated char in a motive fluid that comprises the recycle gas; and
a second reactor configured to accept a mixture comprising the motive fluid with the separated char and configured to accept the char-depleted product gas, wherein the second reactor is further configured to react the separated char and the char-depleted product gas with an oxygen-containing gas to produce a final product gas.

2. The system of claim 1, wherein the motive fluid comprises one or more selected from the group consisting of a gas, carbon dioxide, nitrogen, tail-gas, conditioned syngas, syngas, off-gas, steam, superheated steam, a vapor, and a superheated vapor.

3. The system of claim 1, wherein the eductor is configured to entrain the separated char in the motive fluid, prior to introducing the mixture comprising the motive fluid with the separated char to the second reactor.

4. The system of claim 1, wherein the solids separation device comprises one or more cyclones.

5. The system of claim 1, further comprising:
a primary gas clean-up system configured to cool and remove solids and water vapor and some of the contaminants from the final product gas to produce a first cleaned product gas;
a compression system configured to compress the first cleaned product gas to produce a compressed product gas; and
a secondary gas clean-up system configured to remove contaminants and carbon dioxide from the compressed product gas to produce a second cleaned product gas.

6. The system of claim 5, wherein the carbon dioxide from the secondary gas clean-up system is provided as the recycle gas, prior to introducing the mixture comprising the motive fluid with the separated char to the second reactor.

7. The system of claim 5, further comprising:
a production system configured to produce an intermediate product from at least a portion of the second cleaned product gas.

8. The system of claim 7, wherein the intermediate product includes one or more selected from the group consisting of liquid fuel, a chemical, tail-gas, ethanol, mixed alcohols, methanol, dimethyl ether, Fischer-Tropsch products, and synthetic natural gas.

9. The system of claim 7, wherein one of the intermediate products from the production system is provided as the recycle gas, prior to introducing the mixture comprising the motive fluid with the separated char to the second reactor.

10. The system of claim 7, wherein the production system comprises a reactor including one or more reactors selected from the group consisting of a multi-tubular reactor, a multi-tubular fixed-bed reactor, an entrained flow reactor, a slurry reactor, a fluid bed reactor, a circulating catalyst reactor, a riser reactor, a can reactor, a microchannel reactor, a fixed bed reactor, a bioreactor, and a moving bed reactor.

11. The system of claim 7, further comprising:
a purification system configured to purify the intermediate product to produce a purified product.

12. The system of claim 11, wherein the purified product comprises an off-gas.

13. The system of claim 11, wherein the purified product from the purification system is provided as the recycle gas, prior to introducing the mixture comprising the motive fluid with the separated char to the second reactor.

14. The system of claim 1, wherein the first product gas further comprises hydrogen, carbon monoxide, carbon dioxide, and hydrocarbons; and/or wherein the final product gas has a reduced amount of char and a reduced amount of hydrocarbons, relative to the char-depleted product gas.

15. The system of claim 1, wherein the first reactor is configured to steam reform a carbonaceous material to produce the first product gas.

16. The system of claim 15, wherein the first reactor further comprises:
an input configured to introduce the carbonaceous material to an interior of the first reactor and
a reactant input configured to provide a reactant to react with the carbonaceous material in the first reactor to produce the first product gas.

17. The system of claim 1, wherein the first reactor further comprises a particulate heat transfer material contained within an interior of the first reactor and an optional first reactor heat exchanger immersed within the particulate heat transfer material; or wherein the first reactor comprises an up-flow, catalytic, refractory-lined, steel pressure vessel with a fluidized bed or an up-flow, non-catalytic, refractory-lined, steel pressure vessel with a fluidized bed; and/or wherein the second reactor comprises a cylindrical, down-flow, non-catalytic, lined, steel pressure vessel.

18. The system of claim 1, wherein the first reactor comprises a steam reformer, and/or wherein the second reactor comprises a char/hydrocarbon reformer.

19. The system of claim 1, wherein the second reactor is further configured to accept the mixture comprising the motive fluid with the separated char and configured to accept the char-depleted product gas at different reaction zones within the second reactor.

20. The system of claim 1, wherein the second reactor further comprises a burner configured to react the oxygen-containing gas with a fuel, and wherein the burner comprises an annulus type burner or a pulse combustor burner.

21. The system of claim 1, wherein the second reactor further comprises a second reactor heat exchanger in thermal contact with an interior of the second reactor, and wherein the second reactor heat exchanger is configured to remove heat from within the interior of the second reactor by use of a heat transfer medium.

22. The system of claim 1, wherein the second reactor is further configured to introduce additional oxygen-containing gas between a first char input for the separated char and a product gas input for the char-depleted product gas.

23. The system of claim 1, further comprising:
a feedstock delivery system configured to transfer a source of carbonaceous material to the first reactor.

24. The system of claim 1, further comprising:
a feedstock preparation system configured to accept a source of carbonaceous material comprising municipal solid waste and to produce sorted municipal solid waste in at least one processing step, including one or more processing steps selected from the group consisting of large objects removal, recyclables removal, ferrous metal removal, size reduction, drying or water removal, biowaste removal, non-ferrous metal removal, polyvinyl chloride removal, glass removal, size reduction, and pathogen removal; and
a feedstock delivery system configured to accept the sorted municipal solid waste from the feedstock preparation system as the source of carbonaceous material, wherein the feedstock delivery system is further configured to transfer the source of carbonaceous material to the first reactor.

* * * * *